June 23, 1942.   C. FAIR ET AL   2,287,675
MOLDING PRESS
Filed July 30, 1938   11 Sheets-Sheet 3

INVENTORS.
Charles Fair
Charles B. Gary
BY Pennie Davis Marvin & Edmonds
ATTORNEYS.

June 23, 1942.　　　C. FAIR ET AL　　　2,287,675
MOLDING PRESS
Filed July 30, 1938　　　11 Sheets-Sheet 4

INVENTORS.
Charles Fair
Charles B. Gary
BY
Pennie Davis Marvin & Edmonds
ATTORNEYS.

June 23, 1942.　　C. FAIR ET AL　　2,287,675
MOLDING PRESS
Filed July 30, 1938　　11 Sheets-Sheet 5

INVENTORS.
Charles Fair
Charles B. Gary
BY Pennie Davis Marvin & Edmonds
ATTORNEYS.

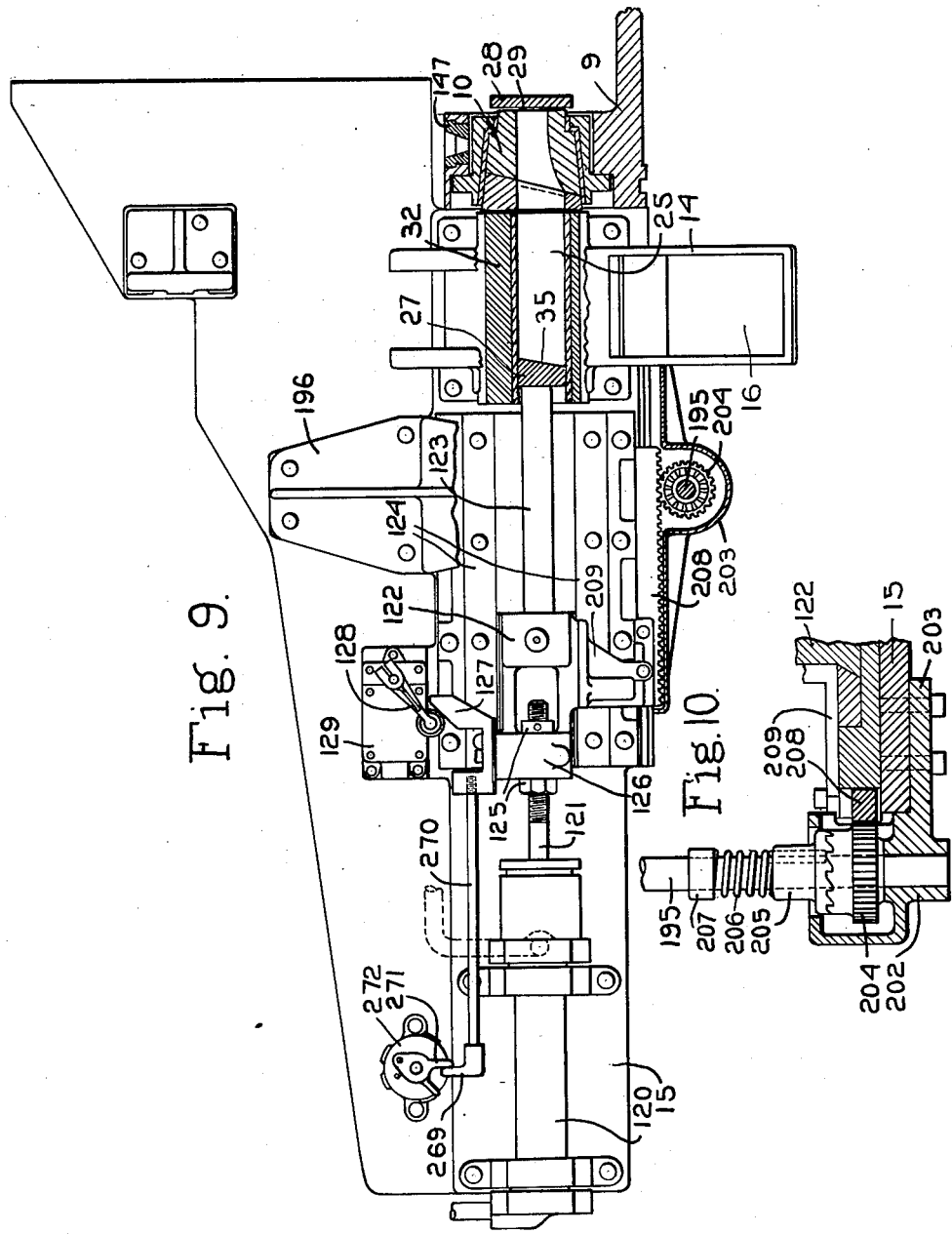

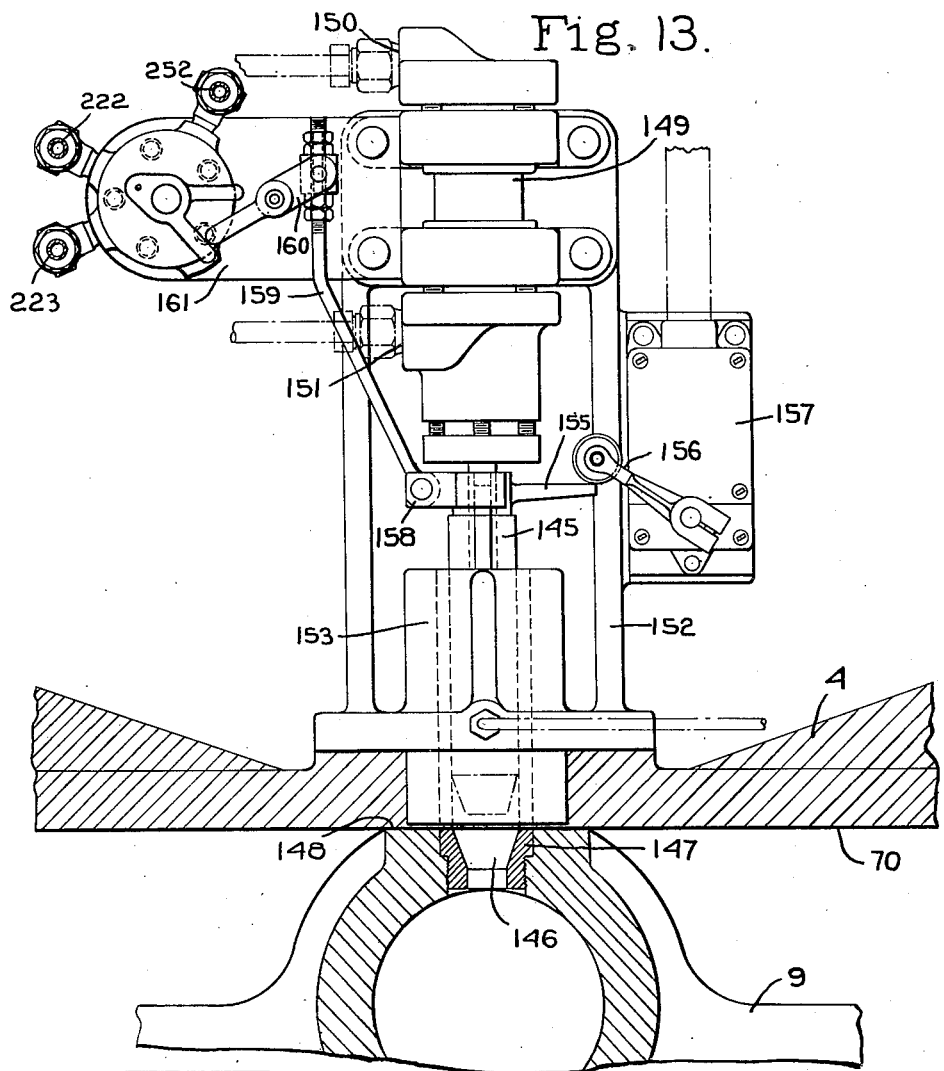
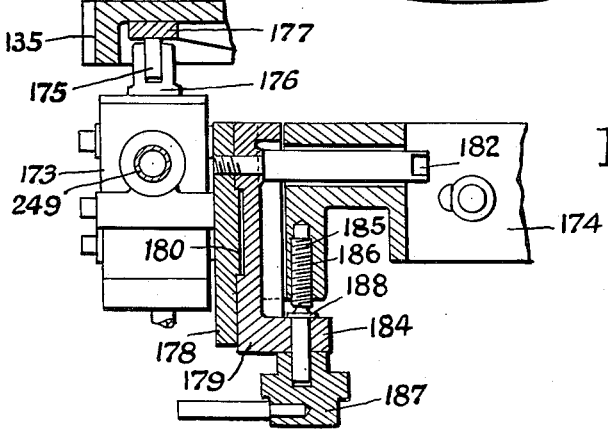

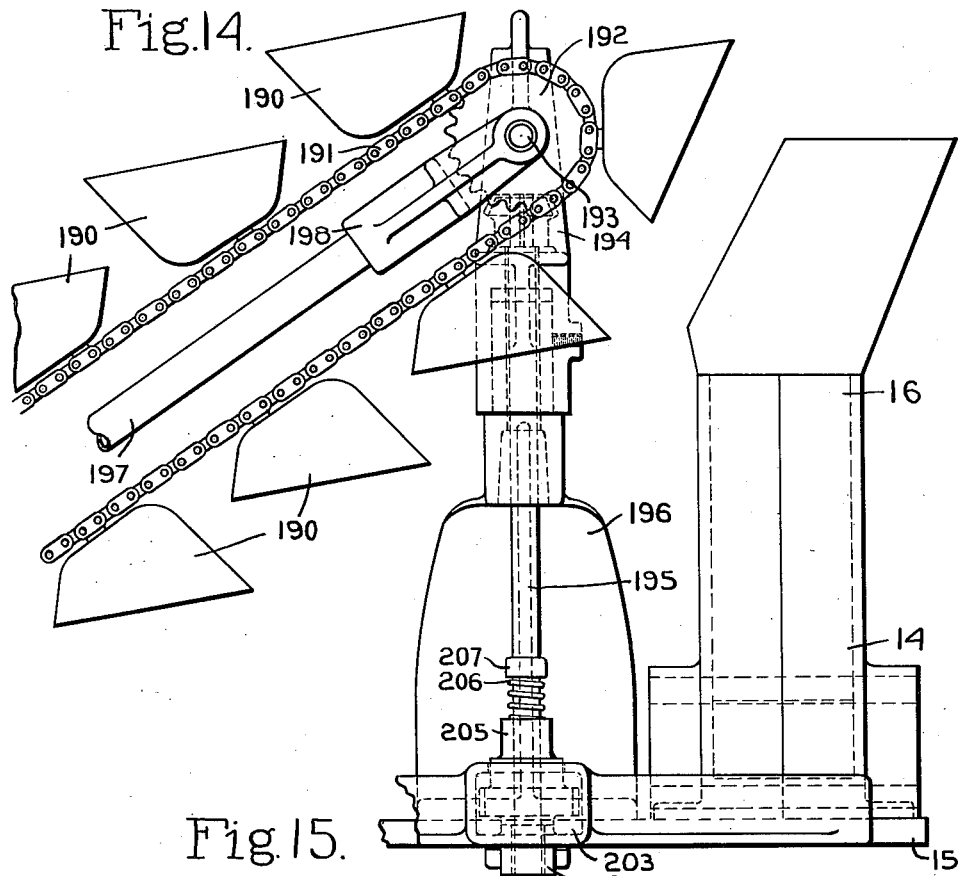
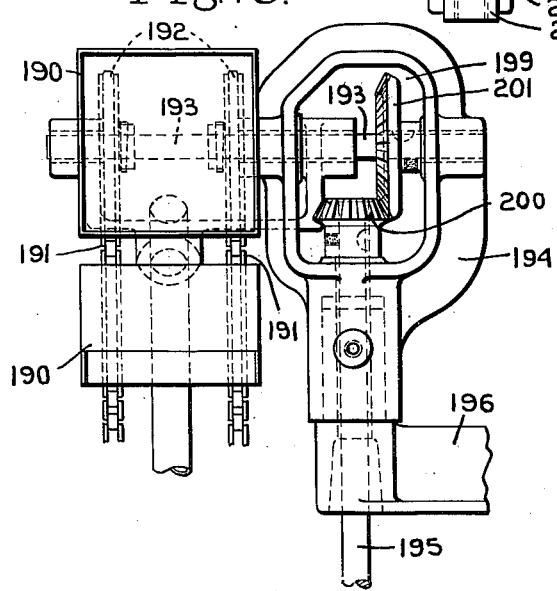

June 23, 1942.   C. FAIR ET AL   2,287,675
MOLDING PRESS
Filed July 30, 1938   11 Sheets-Sheet 9

INVENTORS.
Charles Fair
Charles B. Gary
BY
ATTORNEYS.

June 23, 1942.  C. FAIR ET AL  2,287,675
MOLDING PRESS
Filed July 30, 1938  11 Sheets-Sheet 10

INVENTORS.
Charles Fair
Charles B. Gary
BY
Pennie Davis Marvin & Edmonds
ATTORNEYS.

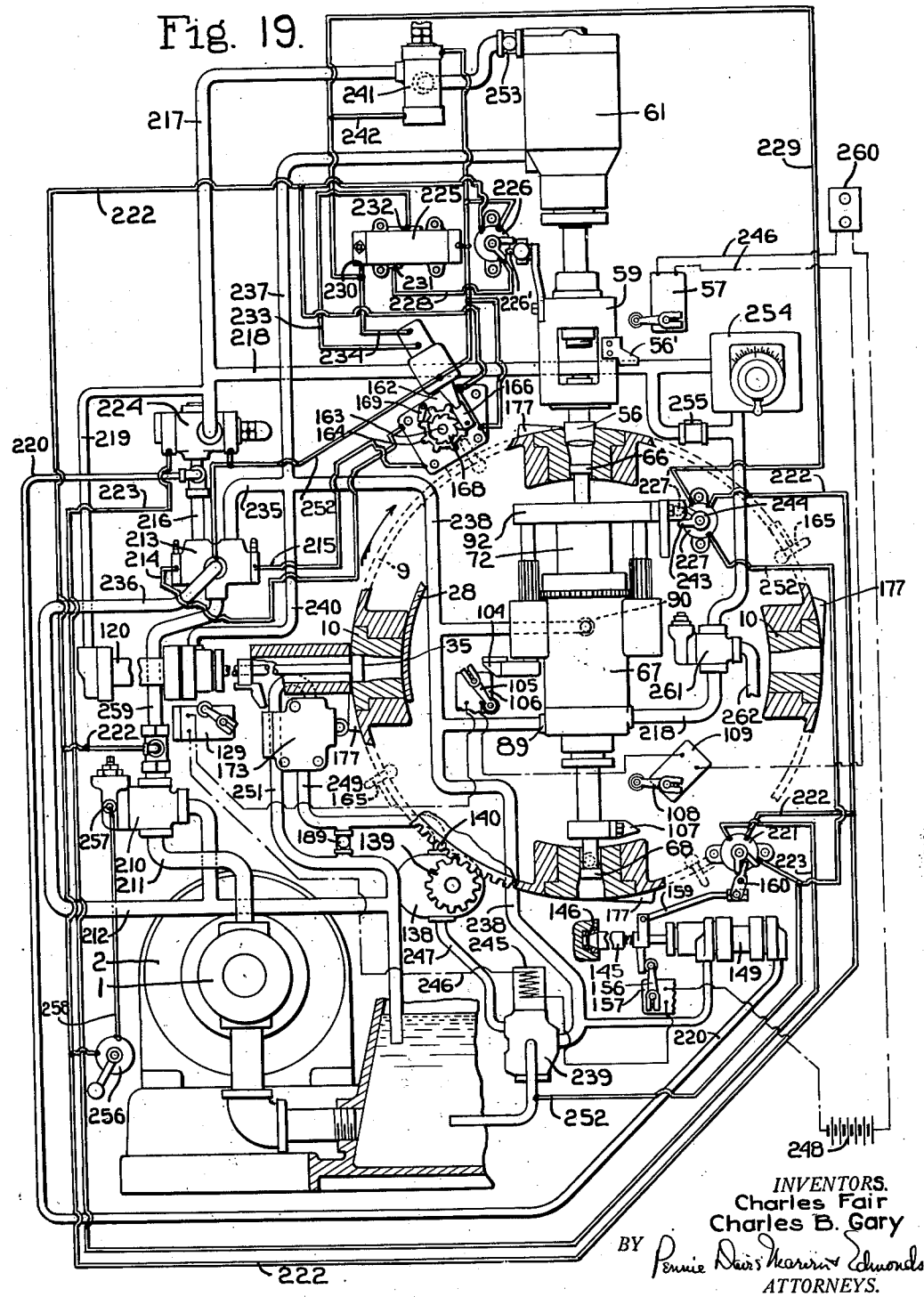

Patented June 23, 1942

2,287,675

UNITED STATES PATENT OFFICE 2,287,675

MOLDING PRESS

Charles Fair and Charles B. Gary, Portsmouth, Ohio, assignors to Vulcan Corporation Application July 30, 1938, Serial No. 222,130

12 Claims. (Cl. 18—21)

This invention relates to a power driven press for molding composition material and particularly to that type of press having a plurality of processing stations.

The principles of the invention apply to a wide variety of pressing and molding operations. In addition to the usual plastic molding practices, the present invention is adaptable to many special and unusual molding operations. To illustrate the invention, a special molding operation will be described, involving the molding by pressure alone, of a material having a high percentage of fiber filling matter. By successfully executing such molding operation as above suggested, the present invention has made it possible to produce molded articles rapidly and at extremely low cost. The relatively high cost of such plastic materials as synthetic resins and Bakelite compositions has prohibited their use in such large commercial fields as the making of heels for the shoe industry.

It is the chief object of the present invention to provide a press for rapidly producing molded articles at low cost.

Another object of the invention is to provide a press employing high molding pressures in which the reactive component of the molding pressures are entirely absorbed by fixed elements rigidly fastened to a main column or frame.

Another object of the invention is to provide a molding press in which molding pressure is applied to the material from opposite directions, thereby minimizing the pressure upon the mold and the mold carrier element and insuring uniform density of the molded article.

A further object of the invention is to provide a molding press capable of automatically molding material requiring relatively great reduction in volume from its raw state to its finished compressed state.

Another object of the invention is to provide a pressure molding apparatus in which the molding material is so manipulated during the operating cycle of the apparatus that the product will have uniform strength and density throughout its structure.

A further object of the invention is to provide a cold molding press in which articles having irregular shape and unevenly distributed masses may be properly molded to produce articles having substantially uniform density throughout their structure.

A still further object of the invention is to provide an automatic molding press which contains a minimum number of mechanical moving parts.

Another object of the invention is to provide a molding press which automatically performs a plurality of successive molding operations.

A still further object of the invention is to provide a molding press in which a plurality of operations are performed simultaneously at a plurality of stations.

A further object of the invention is to provide a molding press having a compact double purpose hydraulic motor which promotes compactness and high efficiency.

Another object of the invention is to provide a molding press having means for effecting pre-distribution of the molding material before it is received by the molds.

A further object of the invention is to provide a molding press having means for pre-condensing the raw molding material in the mold prior to the application of the final molding pressure.

Another object of the invention is to provide a molding press utilizing hydraulic power for obtaining the necessary mechanical movement of its elements.

A further object of the invention is to provide a molding press having a rotating mold carrier element provided with a plurality of mold cavities.

Another object of the invention is to provide a molding press having means for receiving and loading the mold with a measured quantity of molding material in timed relation to intermittent motion of the mold carrying element.

A further object of the invention is to provide in a molding press having a movable mold carrier, automatic means for preventing injury to the molds and plungers caused by mis-alignment of the mold cavities and plungers.

Another object of the invention is to provide an interlocking protective device whereby all inward or pressure producing movement of the plungers is withheld until the movable mold carrier is stopped and indexed precisely.

A further object of the invention is to provide means for withholding motion of the movable mold carrier until all plungers have reached substantially the outer limit of their effective strokes.

A further object of the invention is to provide a molding press in which the molds and co-operating plungers are quickly interchangeable to adapt the press to molding articles of various sizes and shapes.

A further object of the invention is to provide in a molding press individually powered operating units having automatic controls, each of which are automatically actuated by movement of one or more of the other units during their operating cycle.

A further object of the invention is to provide a molding press in which a charge of molding material is automatically manipulated, loaded into the molds and subjected to a light pre-condensing pressure prior to the application of a final independently effected pressing operation.

Other objects and features of the invention will appear from the following specification in connection with the accompanying drawings and will be particularly pointed out in the claims.

The principles of the invention are herein embodied in a machine, which desirably is operated by hydraulic power, although its operation may be effected by other suitable power means. The particular molding operation to be described herein is that of molding shoe heels from a plastic material composed chiefly of wood particles and a binding material. However, the machine is adapted to a wide variety of molding operations.

The structure of the machine is extremely compact and rigid. A plurality of molds are arranged in a mold carrier to be automatically moved into operative relation to a plurality of stations at each of which a specific operation is performed.

In the initial step of the operating cycle of the machine a hopper is fed with a measured amount of plastic material. The hopper is provided with a mechanism which receives the material and moves it into a chamber. An open end of one of the mold cavities in the mold carrier is at this time in alignment with an open end of the chamber in the hopper mechanism. The material in the chamber is then automatically forced into the mold cavity, desirably by means of a plunger.

Upon the completion of this preloading operation of the mold, the mold carrier then moves to a second station where the final molding pressure is applied to the material. Desirably this molding pressure is applied to the material from opposite directions by means of power operated plungers, which may conveniently be hydraulically driven. The mold is then moved to another station where the molded article is ejected from the mold cavity. Inasmuch as there are provided at least as many mold cavities as there are stations, each of the steps above described are performed simultaneously at their respective stations.

To prevent all possibility of damage to the molds by accidental movement of the plungers before the mold cavities are in exact alignment with the plungers, automatic means are provided for preventing such movement of the plungers, such means being controlled by the indexing or mold aligning means, in such a manner that no motion of the plungers is permitted until the final movement of the indexing pin has been effected. Furthermore, movement of the mold carrier is positively prevented until all plungers are completely retracted from the mold cavities.

An important feature of the structure of the press, which promotes extreme compactness and simplicity, is the development of the double purpose hydraulic cylinder working wholly within the rim of the rotary mold carrier.

The press is so constructed that the molds and plungers are readily interchangeable, thereby making it possible to quickly adapt the machine to molding articles of various sizes and shapes, as the occasion demands.

A detailed description of the structure and operation of the embodiment of the invention illustrated in the drawings will be presented hereinafter.

In the drawings,

Fig. 9 is a plan view of the mold loading mechanism detached from the press and showing a portion of the mold carrier in cross section.

Fig. 10 is a detail view illustrating the driving mechanism for the conveyor.

Fig. 11 is a front elevation of the micrometer adjusting mechanism for controlling the decelerating movement of the mold carrier.

Fig. 12 is a cross section on line 12—12, Fig. 11.

Fig. 13 is a view illustrating the mechanism for operating the indexing pin and the manner in which the indexing pin engages the mold carrier.

Fig. 14 is a detail view showing the construction of the bucket conveyor for loading charges of molding material into the hopper.

Fig. 15 is a detail view of the conveyor mechanism, looking toward the left in Fig. 14.

Fig. 19 is a diagrammatic view of the elements of the press, including the main hydraulic circuit and the pilot hydraulic circuit.

Figure 1:
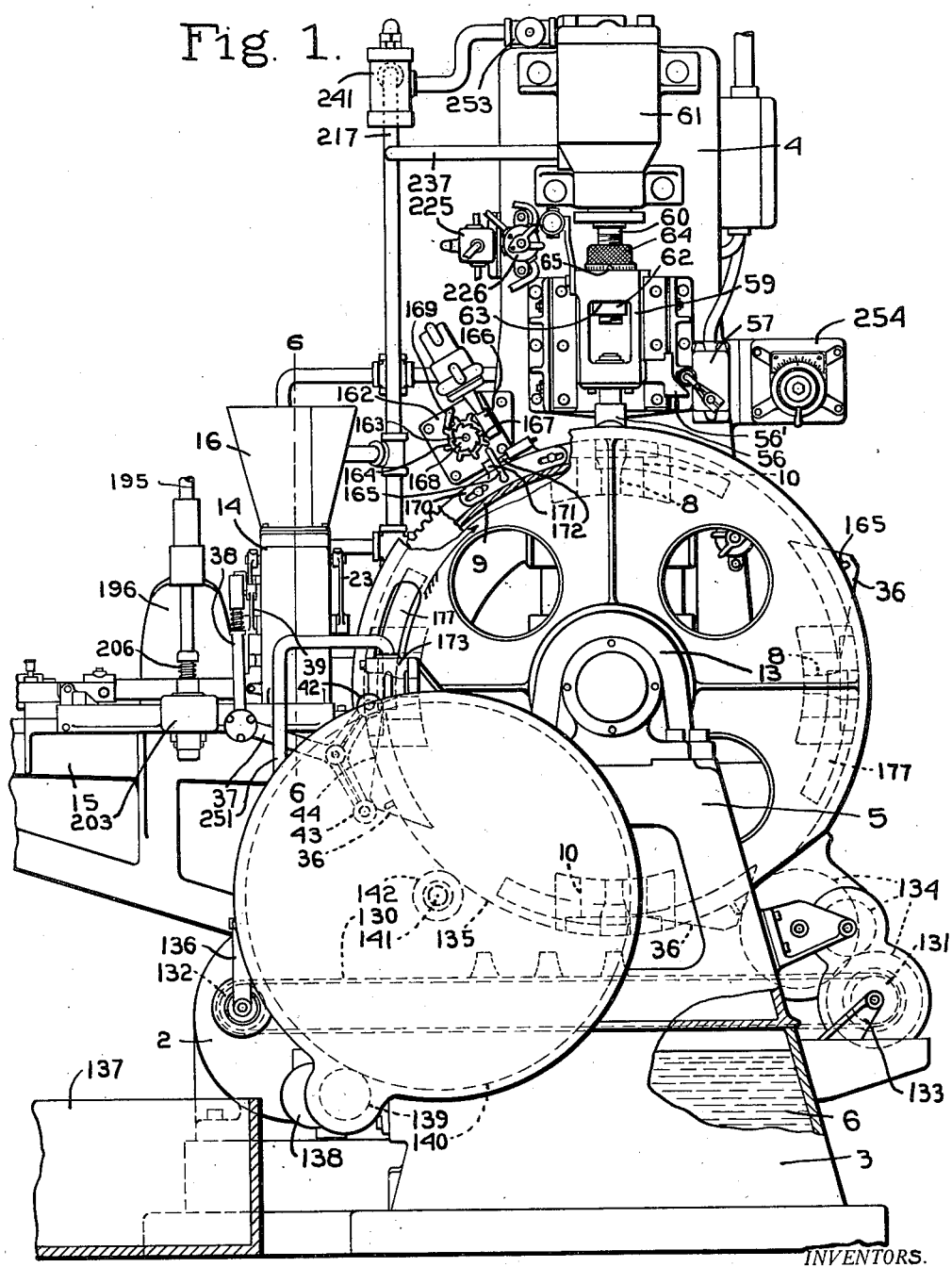
Fig. 1 is a front elevation of the press with portions thereof broken away to clearly show certain details of its construction.

In the embodiment of the invention herein presented as one preferred form of the invention, power for actuating various mechanical movements and for effecting the molding pressure is obtained from a source of hydraulic pressure which may desirably be developed by a pump 1 or any other suitable source. The pump 1 may conveniently be driven by an electric motor 2 mounted rigidly upon the frame 3 of the press. Frame 3 is provided with a vertical column 4 and a horizontal base portion 5. The base of the frame may desirably be employed as an oil reservoir containing a supply of oil 6, which is drawn from the reservoir by the pump 1 through the pump intake line 7. The mold cavities 8 are situated in a mold carrying wheel 9 rotatably mounted on a horizontal axis. The mold cavities are shaped to produce a shoe heel. Articles of any nature may be molded, however, by providing suitable molds. For purposes of description, the term "mold" when used hereinafter, will relate to the removable mold elements 10 which desirably are secured in recess 11 in the rim of the wheel 9. In the embodiment of the invention illustrated, there are four molds situated at 90° intervals in the rim of the wheel.

The wheel 9 is provided with a rigid shaft 12, which desirably is mounted in anti-friction bearings in a pillow block 13 securely bolted to the portion 5 of the main frame 3. Means will be described hereinafter for rotating the wheel one-quarter revolution, at timed intervals, and indexing it accurately in predetermined stationary positions.

When the wheel 9 is in its indexed position, the mold cavities are accurately positioned to receive a plurality of plungers, which successively fill the mold cavities with plastic material at the initial or loading station, then compress the material at a second station and eject the compressed heel at a third station.

Before describing the loading station, it should be pointed out that the special construction of this portion of the press greatly increases the scope of the machine. At the loading or initial station, it is possible to automatically fill the molds with material, whatever the character of the material may be. For instance, materials of widely different viscosity may readily be handled. Also, this loading mechanism is capable of receiving and delivering to the molds, plastic material having qualities which render it relatively incompressible, so that its volume before and after compressing is substantially the same and material which is highly compressible and has a greatly reduced volume after compressing is equally well manipulated by the mechanism.

Figure 6:
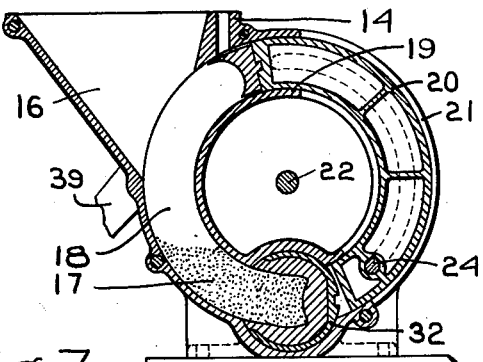
Fig. 6 is a cross sectional view of the mold loading hopper of the press, taken on line 6—6, Fig. 1, and showing the hopper plunger retracted.

To permit handling material of such widely different characteristics as above indicated, the loading station is provided with an especially constructed hopper 14, mounted upon a bracket 15, which in turn is rigidly secured to the frame 3. The hopper is provided with a chute 16 into which a measured quantity of material 17 is placed, from where it falls by gravity into a receiving chamber 18 in a loosely divided state, as shown in Fig. 6. The body 19 of the hopper is substantially cylindrical in shape and is provided with a plunger 20 having the form of a portion of a hollow cylinder. This plunger is received within a complementary raceway 21 in the body 19 of the hopper. The plunger 20 is freely movable in the raceway 21 and is moved therein by a shaft 22 journaled in the body 19 of the hopper at the axis of the cylindrical raceway. The shaft has secured thereto a pair of driving arms 23, the outer ends of which have secured therein a rod 24 which passes through the plunger 20. Movement of the arms 23, therefore, is transmitted to the plunger 20 by means of the rod 24. To permit free movement of the rod 24, the body of the hopper is provided with a pair of circular slots 25, at the sides of the raceway. By rotating the shaft 22, the plunger 20 is caused to oscillate from the position shown in Fig. 6 to that shown in Fig. 7 and back to its original position.

Figure 8:
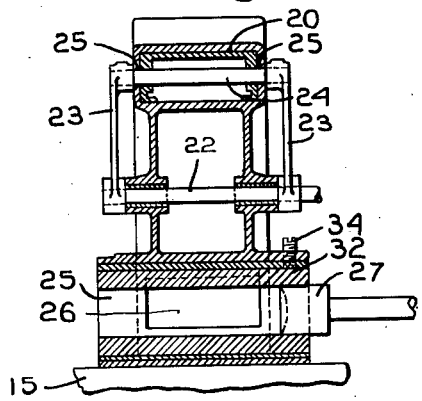
Fig. 8 is a cross section through the hopper taken on line 8—8, Fig. 7.

It will be noted that the material receiving chamber 18 constitutes a part of the raceway 21 and that the chamber opens into a relatively long horizontal discharging or delivery chamber 25, as shown at 26 in Fig. 8. The horizontal chamber 25 is open at both ends and is desirably shaped in cross section substantially to conform to the shape of the top of the mold cavity. When the mold carrier is in its indexed position, the inner end of the chamber 25 is in close proximity to the periphery of the mold in the mold carrier and the chamber 25 is in alignment with the mold cavity, thereby permitting transfer of the molding material from the chamber to the heel mold cavity as shown in Fig. 9.

At the proper time in the cycle of operation of the machine, the shaft 22 is rotated by a mechanism to be described hereinafter, thereby moving the plunger 20 from its position shown in Fig. 6 to that shown in Fig. 7, at which time the plunger forces a measured amount of molding material 17 through the opening or conduit 26 into the chamber 25. A plunger 27 then immediately traverses the chamber 25 and enters the heel cavity a short distance, thereby transferring the material 17 to the mold cavities.

The plastic material used in the particular molding operation herein described is fibrous in nature and before compression has a volume considerably in excess of the volume when compressed. The chamber 25, however, is constructed with ample capacity to receive the material in its loosely dispersed or levitated condition. When the material is transferred to the mold, it becomes pre-compressed by reason of its reduction in volume as it is forced into the mold cavity 8. At the initial or loading position, the inner end of the mold is closed by a plate 28 fixed rigidly upon the column 4 of the machine. The outer face 29 of the plate is cylindrical in form and concentric with the mold carrier axis. The plate 28 extends from the loading station to the second or final compressing station and effectively prevents loss of molding material prior to the application of the final pressure thereon.

Figure 7:
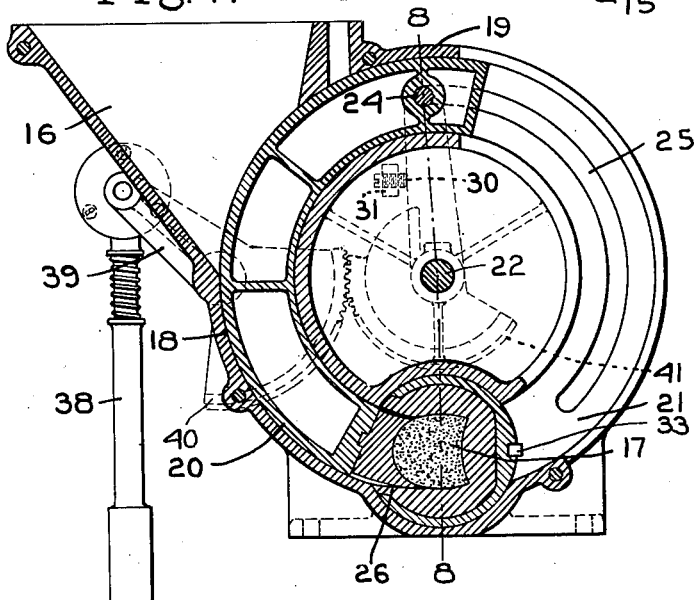
Fig. 7 is a view similar to Fig. 6 showing the hopper plunger at the end of its inward stroke.

The inner or active end of the plunger 20 is so shaped that when the plunger is in the position shown in Fig. 7 its face will register accurately with the wall of the chamber 25, thereby forming a smooth walled continuous chamber from which the plunger 27 will remove all of the molding material. This position of the plunger is desirably accurately determined by an adjustable stop 30 having screw threaded engagement with a boss 31 upon the hopper body 19 and against which one of the arms 23 engages when the plunger 20 is properly positioned.

The chamber 25 is formed in a cylinder 32, which is removable from the hopper body to provide for changing the shape and size of the chamber when a change of molds having a substantially larger or smaller cavity therein requires such a change. The shoe industry requires several sizes of heels to fit a complete range of shoes. However, it has been found that one size of chamber and plunger at the loading station is sufficient for molding a plurality of heel sizes. The cylinder 32 is held in place in the hopper by means of a key 33 and a lock screw 34.

The chamber 25 is desirably made by flowing a soft metal, such as babbitt in a molten state into the cylinder, while a core having the desired shape and dimension is held in proper position within the cylinder, as by means of a fixture. When the metal has solidified and the core removed, the cylinder is ready for use.

In designing the chamber 25 and the plunger 27, careful attention was paid to the shape of the object to be molded. As above pointed out, the cross section of the chamber is substantially the same as the seat or outer end of the mold cavity, while the plunger is made to fit the chamber. This construction insures, not only that the material will be completely transferred to the mold cavity, but the material will be transferred evenly to all parts of the mold cavity, thus insuring that the finished article will exhibit a uniform strength and density. Furthermore, by shaping the cross sectional form of the plunger to that of the mold cavity, it is permitted to enter the mold cavity to exert a pre-molding pressure upon the molding material. The pre-molding pressure thus applied, reduces the volume of the material sufficiently to be received in the mold cavity.

To further insure the uniform density of the product, the end 35 of the plunger 27 is or may be disposed at an angle substantially conforming to the angle of the seat of the finished heel. In certain other instances, this angle may be varied to produce a desired result. It may be found desirable to reverse the angle with respect to the seat of the heel to produce a desired variation in density in the finished product or to compensate for an undesired tendency toward density variation in the density of the product. The plunger 27 penetrates the mold cavity substantially to the dotted line shown in Fig. 9, thereby causing the pre-compressed mass of molding material to roughly conform to the final shape of the heel. This principle of controlled distribution of the molding material in its loose state is applicable to molded articles other than heels for shoes by properly shaping the chamber 25 and the plungers 27 so that the desired control will be effected.

It is an important feature of the invention that such control of the material is exercised and the principle involved is particularly applicable to the material of the character herein employed. From extensive experimentation, it has been found that the material when under high pressure exhibits a very slight degree of flow and, therefore, unless the distribution of the material is correct when it is in its loose granular condition, the finished product will lack uniformity and exhibit soft spots. The construction of the hopper as above described, insures even distribution of the material while it is a relatively loose granular condition and maintains this condition up to the point where it is ready to receive the final molding pressure.

Any suitable means may be employed for rotating the shaft 22 to operate the plunger in the hopper. As shown herein, mechanical means are provided for accomplishing this result, which is actuated by means of a cam 36 upon the mold carrier shown in Fig. 1. There are four such cams upon the mold carrier, one for each of the molds therein.

Motion of the hopper plunger 20 is derived from a lever 37 which is engaged by the cam 36 as the mold carrier rotates. Motion of the lever 37 is transmitted to a link 38, which in turn is connected to a lever 39. The lever 39 is fulcrumed on the hopper and is provided with a gear segment 41 rigid with one of the arms 23. Motion of the lever 37 imparted thereto by the cam 36 is thus transmitted to the shaft 22 and the plunger 20. The lever 37 is provided with a pair of cam followers 42 and 43 for engaging the cam. When the mold carrier 9 is in its rest or index position, the follower 43 is resting upon the high point of the cam 36 and in this position of the lever, the plunger 20 is in its closed position. The closing motion takes place as the follower rides upon the cam face 44 as the carrier 9 approaches its index position. After the plunger 27 has filled the mold with material and has been withdrawn, the carrier is moved in the direction of the arrow and at this time, the follower 42 rides upwards upon the face 44 of the cam and the lever 39 acts to move the plunger 20 to its open position shown in Fig. 6. The hopper plunger may, however, be operated by other than mechanical means, such as hydraulic power. Such a means will be hereinafter described.

Figure 16:
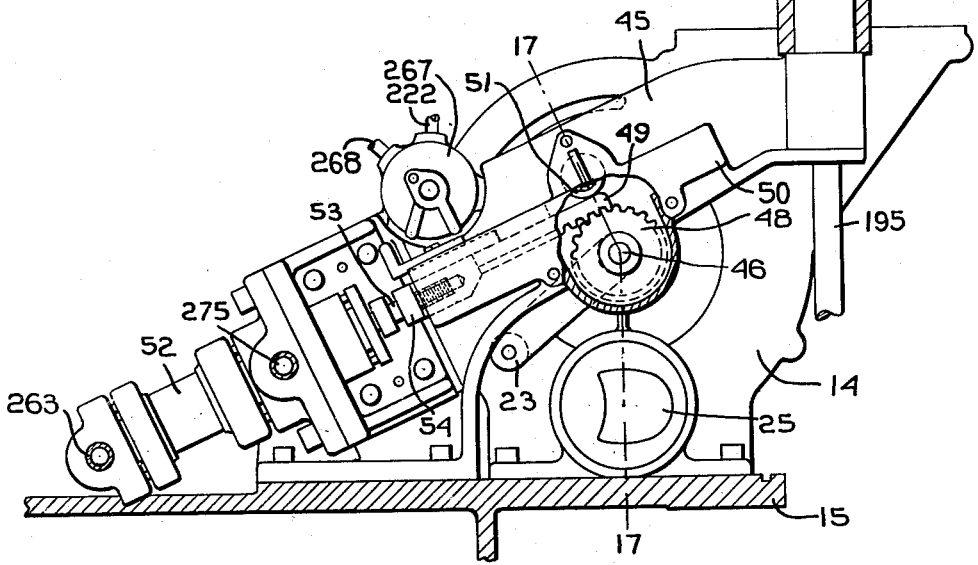
Fig. 16 is a side elevation of a modified form of hopper actuating mechanism.
Figure 17:
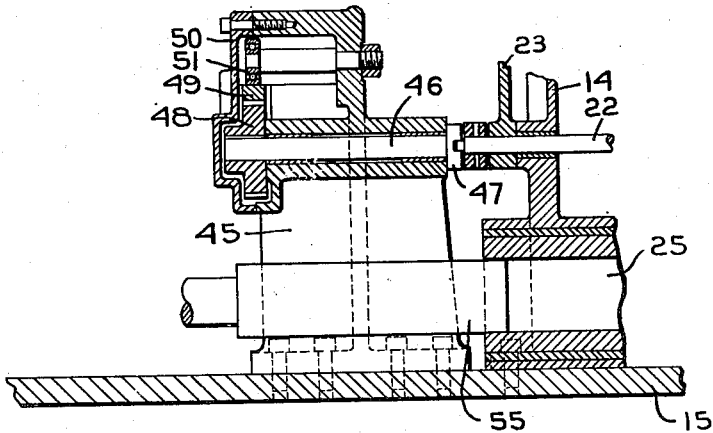
Fig. 17 is a cross section taken on line 17—17, Fig. 16.
Figure 18:
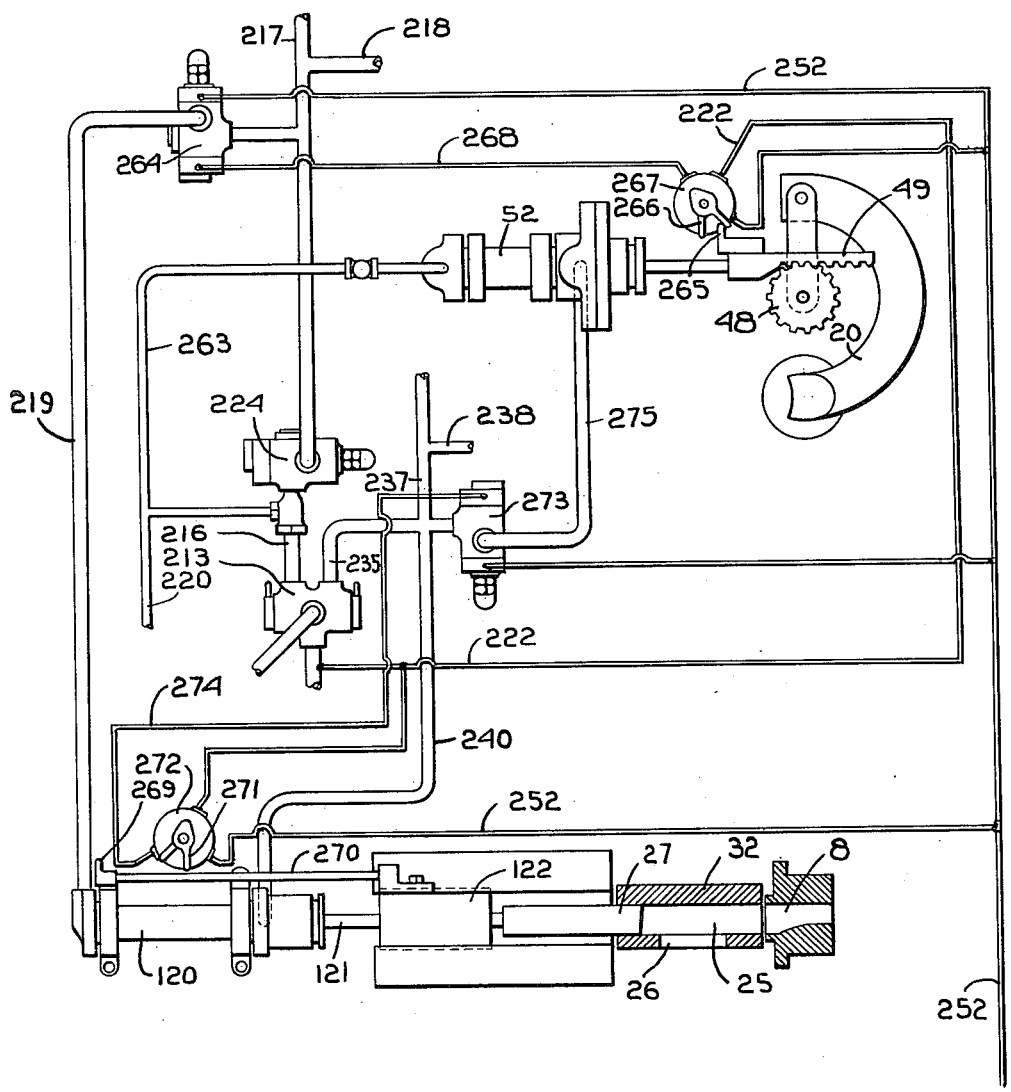
Fig. 18 is a diagrammatic view illustrating the hydraulic operation of the hopper mechanism shown in Fig. 16 and the mold loading mechanism shown in Fig. 9.

In Figs. 16, 17 and 18 a hydraulic mechanism is illustrated for operating the plunger 20 within the hopper casing 19. This hydraulic mechanism is supported upon a bracket 45 securely bolted to the bracket 15 upon which the loading station is mounted. The bracket 45 is provided with a journal within which is received a shaft 46, which is in axial alignment with the driving shaft 22 of the hopper. The shafts 22 and 46 are coupled in any desirable way, such as by means of a flexible coupling 47. Upon the outer ends of the shaft 46 a gear 48 is rigidly keyed. Connecting with the gear 48 is a rack bar 49 which is guided in a linear path within a casing 50 upon the bracket 45. Desirably an anti-friction bearing 51 is positioned within the casing at a point opposite to the point of meshing between the gear and the rack and engaging the back face of the rack 49, thereby acting to absorb the thrust occurring between the gear and the rack during the operation of the mechanism.

The rack 49 is actuated by a hydraulic cylinder 52 rigidly secured to the bracket 45. The piston rod 53 of the cylinder 52 is adjustably secured to the lower end of the rack 49. The rack is provided with a threaded aperture within which is received the threaded end of the rod 53. It is desirable that when the piston within the cylinder 52 has reached the inward end of its travel and stops against the head of the cylinder that the plunger 20 will at that time be accurately positioned with respect to the walls of the chamber 25 as hereinbefore described.

To obtain this accurate adjustment, the piston rod 53 is rotated, thereby screwing its threaded end inwardly or outwardly from the threaded aperture in the end of the rack 49 until the required adjustment is obtained and such adjustment is then maintained by turning the lock nut 54 firmly against the end of the rack. The travel of the piston within the cylinder 52 is sufficient to retract the plunger 20 to the position shown in Fig. 6. The control of the operation of the cylinder 52 with the resulting actuation of the plunger in the hopper will be described hereinafter in connection with the general operation of the machine.

Another form of plunger for transferring the material from the chamber 25 to the mold cavities is illustrated in Fig. 17. This plunger 55 has a cross sectional shape to closely fit the chamber 25 and is of a length greater than the length of the cylinder 32, so that the plunger when it has reached the end of its inward stroke will completely fill the chamber 25 and project the necessary distance into the mold cavities. In this manner the chamber 25 cannot receive a charge of molded material while the plunger is acting to transfer the charge which has been delivered to the chamber 25 to the mold cavity, since the opening 26 is at this time closed completely by the plunger 55. This provides a longer interval of time during which the plunger 20 may remain retracted, thereby permitting various manipulation procedures to be effected in connection with the reception of a measured charge of material in the hopper chute or port 17.

Upon completion of the necessary operations above described at the loading station, the mold carrier is indexed to bring the mold, which has just received its charge of material into its second or final molding station, where a plunger 56 enters the top of the mold carrier and a plunger also enters the bottom of the mold aperture to compress the material to its final shape. The plunger 56 has a bottom face 58, which is properly shaped to impress a concaved heel seat upon the heel designed in accordance with a predetermined requirement. The plunger 56 is detachably secured to a cross head 59 guided in a vertical path within ways rigidly secured upon the column 4. The cross head 59 is adjustably connected to the piston rod 60 of a hydraulic cylinder 61. The cylinder 61 is rigidly secured to the upper end of the column 4. The cylinder 61 is of a standard type of double acting hydraulic cylinder. The travel of the piston rod 60 desirably is determined by the contact of the piston with the rod end of the cylinder on its downward stroke and by contact with the head of the cylinder upon its up stroke. At the end of its up stroke, when the plunger 56 is clear of the mold, a cam 56' on the cross head 59 engages a circuit closing arm upon a limit switch 57 mounted on the column 4. The switch 57 is connected in series in an electric circuit, the function of which will be described hereinafter.

It is desirable that the limit of travel of the plunger 56 downward be adjustable to provide for molding heels or other articles of various sizes and shapes. The working face of the plunger 56 functions as the top of the closed mold and its final position at the end of the molding or final pressing stroke determines the required dimensions and contour of the upper portions of the mold and consequently also of the heel or other molded articles. This adjustment may be obtained in any desirable manner. As indicated herein, the lower end of the piston rod 60 is threaded and projects through the upper portion of the cross head 59 and has a nut 62 which engages the face 63 on the cross head. A relatively large nut 64 is threaded upon the piston rod 60 and engages the top face of the cross head 59. The nut 64 desirably is provided with indication marks on its periphery by means of which a certain adjustment may be tabulated and by means of which a change of adjustment is plainly indicated in some known unit of measurement, such as thousandths of an inch. The indication marks are engraved upon the nut 64 while the pointer 65 serves as a fixed reference point from which the indications are read.

Figure 3:
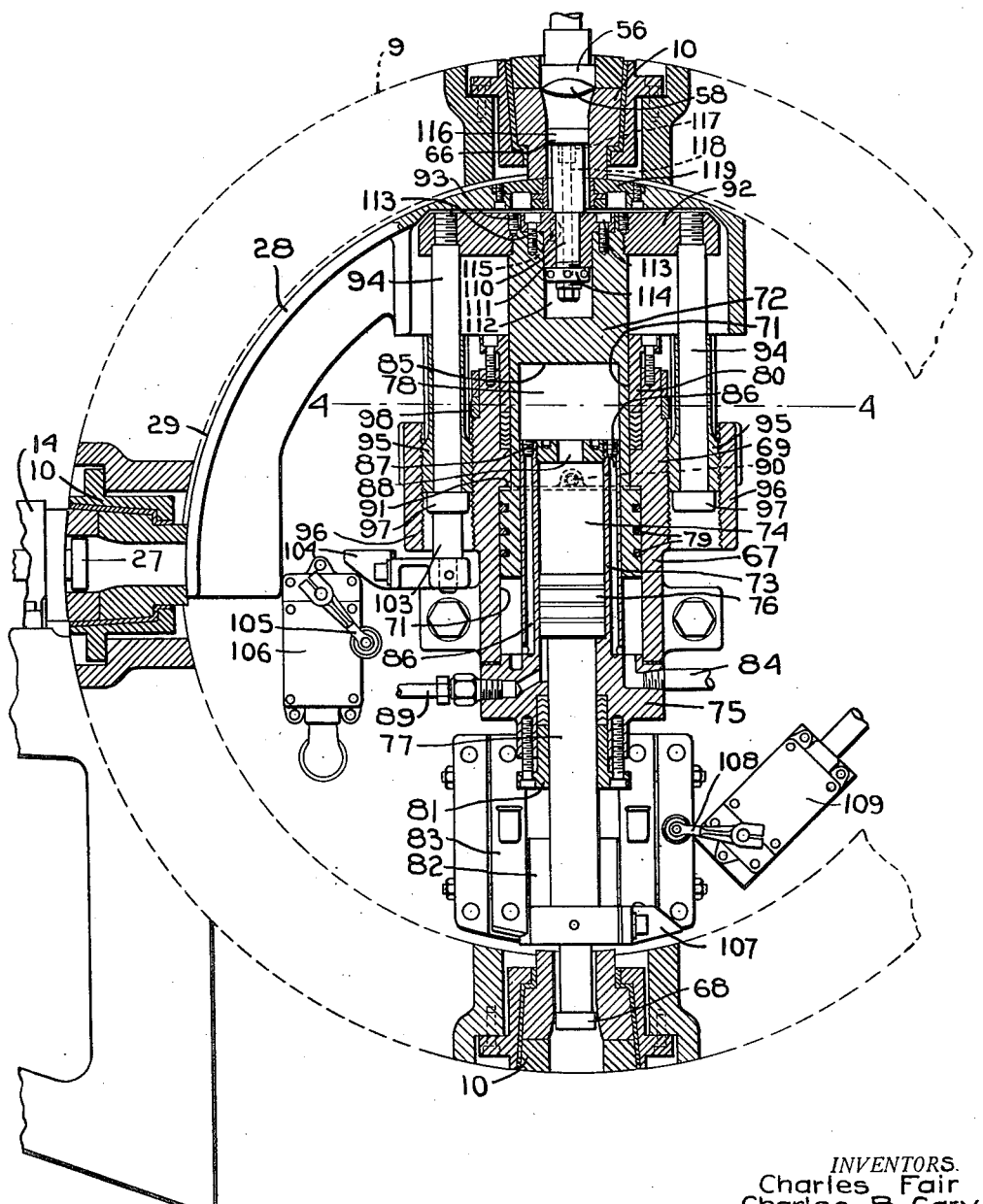
Fig. 3 is a vertical cross section through a double plunger hydraulically operated unit, which performs two of the operations in the cycle of operation of the press.
Figure 4:
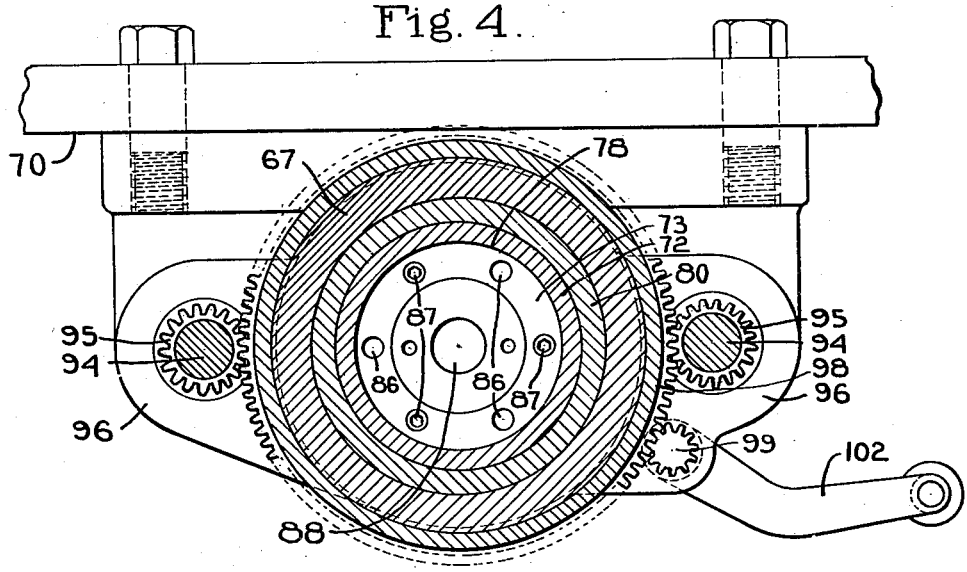
Fig. 4 is a cross sectional view on line 4—4, Fig. 3.
Figure 5:
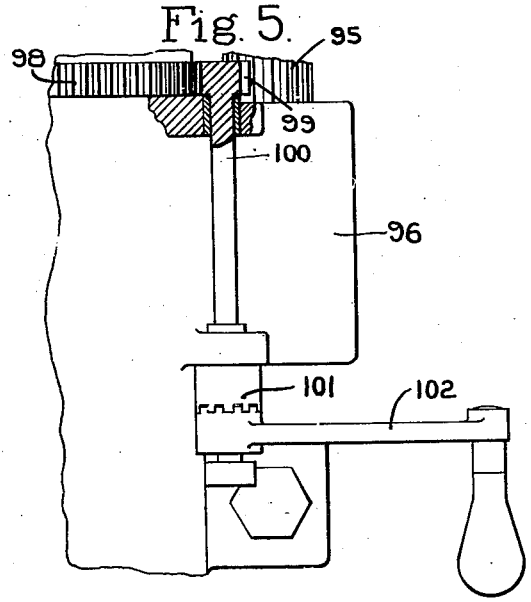
Fig. 5 is a detailed view illustrating a portion of the mechanism shown in Fig. 4.

At approximately the same instant as the plunger 56 descends, another plunger 66 moves upward into the lower end of the mold. The timing of the relative travel of these plungers is adjustably determined in a manner to be described. The plunger 66 is moved upward by means of an especially constructed hydraulic motor shown in Fig. 3. This motor performs a double function, namely that of moving the plunger 66 upward and also that of forcing a plunger 68 downward, the latter plunger acting to eject the molded heel from the mold which is diametrically opposite to the upper or main pressing station. It will be noted that this hydraulic motor is wholly contained within the rim of the mold carrier, thereby conserving a great deal of space which would otherwise be occupied by elements outside the rim of the wheel, or a much larger carrier would be required.

The motor 67 is provided with a main frame 69 securely bolted to the face 70 of the column 4. The frame 69 is provided with a main cylinder bore 71, within which is received a piston 72 to which is secured the plunger 66. Within the bore 71 is concentrically received another cylinder 73 having a bore 74 of smaller diameter than the bore 71. The cylinder 73 is desirably cast integrally with the head 75 and securely bolted to the lower end of the main frame 67. The head 75 serves as a closure for the lower end of the motor. A piston 76 reciprocates within the bore 74 and is provided with a piston rod 77 to the lower end of which is secured the ejecting plunger 68.

The piston 72 has a central or axial bore 78 of the proper diameter to receive and telescope upon the inner cylinder 73. The lower end of the piston 72 is provided with rings 79 to prevent the escape of fluid past the piston and a gland 80 is provided to prevent escape o fthe liquid. The piston 76 is provided with rings, and escape of liquid from the cylinder is prevented by a packing gland 81.

Rigid alignment of the plunger 68 is maintained by means of a cross head 82 moving in guide ways 83 bolted to the column 4. The length of the piston 72 is such that its engagement with the walls of the bore 71 constitutes adequate rigidity of alignment. The construction of the piston 72 is such that the total length of the whole double plunger unit is reduced, as will be pointed out hereinafter.

At the end of the power stroke of the piston 76, the piston comes to rest against the rod end wall of the bore 74, and at this time, the plunger has entered the mold sufficiently to positively eject the molded heel. The limit of the power stroke of the plunger 66 is accurately adjustable in a manner to be described.

The operation of the double plunger hydraulic motor is as follows: The actuating fluid under pressure induced by the pump 1 is admitted to the conduit 84 into the lower end of the bore 71 where it acts against the area 85 of the piston 72 and also flows through passages 86 in the walls of the cylinder 73 and enters the bore 78. The lower extremity of the passages 86 communicate with the cylinder bore 71 while the upper end of these passages communicate with the bore 78. The bore 78 is thus filled with fluid under pressure which exerts a force against the end wall 85 of the bore 78 in the piston 72. The total area of the piston 72 is thus effectively utilized for forcing the plunger 66 upwardly. In the embodiment of the invention shown herein, there are six of the passages 86, and means in the form of threaded plugs 87 are provided for closing one or more of the passages. By this means, control is exercised over the speed of travel of the plunger 66 by restricting the flow of oil through the passages 86. The oil flowing into the chamber 78 also flows through an aperture 88 in the top of the cylinder 73, and into the bore 74 acting upon the top of the piston 76. The same charge of fluid, therefore, actuates both plungers 66 and 68.

To withdraw the plungers from the molds, the conduit 84 is disconnected from the source of pressure and connected to a tank return line. The port 89 is then connected to the source of pressure from the pump 1, thereby to admit fluid beneath the piston 76, causing it to move into its retracting position. Likewise, oil under pressure is admitted through the port 90 to a chamber above the shoulder 91 on the piston 72, thereby acting to retract the piston and plunger 66. Before the succeeding power stroke of the two plungers, the ports 89 and 90 are disconnected from the source of supply and connected to a tank return line. The automatic timing of the operation of these plungers with respect to the other operations in the cycle of the machine will be described hereinafter.

Adjustable means are provided for limiting the upward or power stroke of the plunger 66. Adjustment at this point is desired to provide for molding heels or other objects of different heights. When the molds are changed to produce a different size or type heel, the stroke of the plunger is adjusted to provide the required height. An important advantage of this adjustability lies in that heels or similar objects having different heights, but otherwise of the same general contour, may be molded without changing the molds by the simple expedient of changing the stroke of the bottom plunger 66. The lower portion of the walls of the heel mold cavities is only slightly curved, consequently, throughout the range of adjustment employed to produce a predetermined range of heel height, the resulting heels have a satisfactory contour. Thus, the number of sets of molds required to supply commercial requirements is greatly reduced.

This adjustment of the stroke of the plunger 66 may be obtained in any suitable manner. In the illustrated form of the invention, special means for accomplishing this adjustment are devised to facilitate effecting the adjustment, which otherwise, would be difficult due to the construction of the machine. The wheel or mold carrier 9 embraces the motor 67 and thereby makes the ordinary wrench adjustment difficult. The top of the piston 72 has secured thereto a head 92 projecting a substantial distance laterally outward from the piston. The head may be secured to the piston in any suitable manner, such as by threaded engagement therewith, such engagement desirably being locked against detachment by one or more lock screws 93.

A pair or stop rods 94 are securely fastened in the head 92 and depend therefrom, being loosely received in a pair of elongated stop nuts 95, which are received in and have threaded engagement with a pair of bosses 96 integral with the frame 69 of the motor. The stop rods 94 are provided with shouldered heads 97, which engage the bottom face of the nuts 95 and determine the top limit of movement of the plunger 66. The upper ends of the nut 95 are provided with elongated gear teeth, which mesh with a ring gear 98 mounted to rotate upon the periphery of the motor frame concentrically with the cylinder bore 71. The pitch diameter of the nuts 95 is equal, consequently when the ring gear 98 is rotated, the nuts 95 are rotated at the same speed and an equal adjustment at both rods is obtained.

When making the adjustment of the stroke of the plunger 66, the ring gear 98 is manually rotated by means of a small gear 99 meshing therewith and secured upon the end of a shaft 100 which is journaled in the frame 69. The lower end of the shaft 100 has secured thereto one member of a clutch 101, the other member of which is loosely received upon the shaft and is provided with a crank 102. By manipulating the clutch into and out of engagement and rotating the crank 102 in short strokes made necessary by the limited space, the nuts 95 are adjusted to establish the desired stroke of the plunger. Any other suitable means may be employed to make this adjustment.

One of the stop rods 94 is provided with an extension 103 upon the end of which a cam 104 is adjustably mounted. Upon retraction of the plunger 66, the cam 104 engages the end of the switch arm 105, upon a switch 106, thereby closing a portion of an electric circuit to be described hereinafter. The cross head associated with the plunger 68 is provided with a cam 107 which, upon retraction of the plunger 68, engages with an arm 108 of an electric switch 109, thereby closing another point in the same circuit in which the switch 106 is connected.

The plunger 66 is interchangeably connected with the piston 72, such interchangeability being required to provide properly fitting plungers when the molds are changed to produce different sizes and types of heels. The plunger 66 is provided with a stem 110 which is received within a collar 111 detachably fastened in the upper end of the piston 72. The collar 111 is rigidly secured within a recess 112 in the piston desirably by means of a plurality of screws 113. The lower end of the stem 110 of the plunger is screw threaded to provide for the reception of a nut 114 by means of which the stem is rigidly secured in the collar 111. The stem 110 desirably is prevented from rotation within the collar 111 by means of a key 115. The extreme upper end of the plunger is shaped to accurately fit in the lower end of the mold and desirably is made detachable from the body portion of the plunger. This construction requires only that the upper end of the plunger be changed when a new type of mold is fitted to the mold carrier for the production of a new type of heel. Desirably this end portion 116 is provided with a short stem 117 which is received within the upper end of the plunger body and keyed in position. The lower end of the stem 117 is provided with a threaded aperture within which is received the end of a long anchoring screw 118, which extends through the complete length of the plunger body and stem with its head engaging the lower end of the stem.

When the plunger 66 is retracted, the top end 116 thereof is received within a nicely fitting aperture within a plate 119 removably received in the plate 28 secured to the column of the press. A plate 119 is provided for each size of plunger. The object of the plate 119 is to prevent the unpressed material in the mold cavities from escaping from the mold before the plunger 66 starts on its upward stroke.

The plunger 35 at the first or loading station is desirably actuated by a hydraulic cylinder 120. This cylinder is rigidly bolted to the bracket 15 upon which is mounted the hopper 19. The cylinder 120 is double acting and connected to the hydraulic power supply system in a manner to be described. The piston rod 121 is adjustably connected to the cross head 122 to which the outer end of the shank 123 of the plunger is rigidly secured. The cross head 122 is held in rigid alignment with the chamber 25 in the hopper by means of guide-ways 124 rigid with the bracket 15. The length of the stroke of the plunger 35 is determined by the travel of the piston within the cylinder 120 between the head and rod end of the cylinder. The position of the plunger 35 at the inner end of its stroke is adjustably determined by the nuts 125 upon the threaded end of the piston rod 121 which engage opposite faces of the boss 126 upon the cross head 122. Obviously, the necessary adjustment may be made by moving the two nuts 125 along the rod 121 and using one of the nuts as a lock nut to secure the parts in their correct position. The cross head 122 has mounted thereon a cam 127 which is so positioned as to engage the arm 128 of the switch 129, when the plunger 35 is in its fully retracted position. The switch 129 closes another point in the circuit in which the switches 106, 109 and 57 are connected.

Desirably, a conveyor is provided for receiving the completed heels at their point of ejection and carrying them to a convenient point from where they can be received in a suitable container. This conveyor may take the form of an endless belt 130, the upper run of which is situated directly below the heel molds when they are situated at the ejecting station. The belt 130 passes over a pair of pulleys 131 and 132. The pulley 131 is rotatably mounted in a bracket 133 rigidly mounted upon the base of the press. The pulley 131 is driven in any suitable manner, such as by means of a train of gears 134, the input end of which receives its power from a large gear 135 upon the mold carrier 9. The pulley 132 is received and idly rotates within a bracket 136 mounted upon the frame of the press. As the belt 130 runs over the periphery of the pulley 132, heels are dumped into a receptacle 137.

The wheel or mold carrier 9 is driven by means of a suitable hydraulic motor 138 receiving its power from the pump 1. The motor 138 is provided with a pinion 139 mounted upon its output shaft. The pinion 139 meshes with a gear 140 which is mounted upon a shaft 141, journaled upon the base 5 of the press. On the inner end of the shaft 141 is secured another gear 142, which meshes with the gear 135 upon the mold carrier. Desirably, the pinion 139 and gear 140 are protected by a suitable guard 143. The gear 135 and the wheel 9 are provided with a guard 144.

As previously pointed out, the mold cavities must be accurately aligned with the various plungers when the mold carrier arrives at its stationary or indexed position. A desirable form of mechanism for accurately indexing the wheel is illustrated in Fig. 13. A single indexing finger 145 is supplied to lock the wheel in correct position. This finger is successively thrust into accurately fitting recesses 146 in the mold carrier at each quarter revolution thereof. There is one of these recesses accurately positioned with respect to each of the four mold cavities and accurately positioned angularly about the wheel, each recess being situated at 90° with respect to each other. The aperture 146 is desirably formed in a hardened sleeve or bushing 147 which is rigidly received within a threaded recess in the mold carrier. The pin 145 may also be hardened and thus insure permanent accuracy of the indexing mechanism.

The pin 145 may conveniently be located in the face 70 and near the bottom of the column 4 in position to enter the aperture 146 associated with the mold at the bottom of the mold carrier. Preferably the mold carrier is faced off at 148 and moved in close proximity to the finished face 70 of the column. The pin 145 is tapered at its end and the bushings 147 have a complementary taper, thus insuring a wedging action between the pin and the bushings, which positively locks the mold carrier in accurate alignment with the plungers.

The pin 145 may be actuated by any suitable means. However, since the illustrated embodiment of the invention is hydraulically powered, the indexing pin is desirably actuated by a hydraulic double-acting cylinder 149 having a port 150 leading to the head thereof and a port 151 leading to the rod end thereof. The cylinder 145 is supported upon a frame 152, which is rigidly supported upon and received within the column 4. The pin 145 is permitted to freely move without side play within a hollow boss 153 integral with the bracket 152. The pin 145 is in alignment with and connected to the piston rod of the cylinder. The pin 145 has connected thereto a projection 155, which at the inner limit of the stroke of the pin, engages an arm 156 of an electric switch 157. The switch 157 is connected in the same circuit as the switches 57, 106, 109 and 129.

The piston rod has a lateral projection 158 to which is pivotally connected a link 159, which in turn has pivotally connected therewith one end of a lever 160 fulcrumed upon a plate 161 secured to the cylinder 149. The free end of the lever 160 engages the actuating head upon a hydraulic pilot valve, the function of which will be described hereinafter in connection with the description of the operation and the sequence of steps in the cycle of operation of the press.

As will appear hereinafter, the operation of the press illustrated in the drawings is automatic and depends to a large extent upon mechanically operated hydraulic valves. One of these valves depends upon a mechanism which will best be described at this point to avoid interruption of the continuity of the description of the complete automatic cycle of the machine to be presented hereinafter.

The valve in question is designated generally by the numeral 162 and is mounted upon a suitable bracket secured upon the column of the press. The valve 162 is of a commonly employed type of hydraulic valve, in which the flow of fluid from the valve is controlled by a rotor within the valve casing. The valve is connected in the pilot-controlling system of the press, which functions to control "in and out" movement of the plungers 56, 66 and 68. The rotor of the valve is provided with an actuating shaft 163, upon which is mounted a toothed wheel 164. The valve body is so mounted with respect to the mold carrier 9 that the teeth of the wheel 164 are in the path of and engaged by four fingers 165 mounted on the periphery of the carrier 9. The fingers are correctly positioned upon the carrier to cause the wheel 164 to rotate the pitch angle between successive teeth, which in this case is 45°, just before the carrier arrives in indexing position. This rotation of the valve causes a required flow in the pilot line leading to the valve. After a predetermined interval of time, the valve must be actuated again. Since the carrier is now motionless, other means are provided to again actuate the valve rotor. Such means are provided in the form of a small hydraulically operated plunger 166, which is actuated by remote control from another element to be described. The plunger is provided with a latch 167, which engages a ratchet wheel 168, also on the valve rotor shaft 163, the teeth of which are spaced 45° as are the teeth on the wheel 164. The valve rotor is thereby rotated another quarter revolution to produce another change of flow in the pilot circuit. The next movement of the valve rotor is caused by the succeeding finger 165 on the carrier as it moves into the indexing position. A spring pressed detent 169 acts to prevent reverse motion of the valve rotor.

The fingers 165 are pivoted upon plates 170 adjustably secured upon the rim of the mold carrier to enable them to be adjusted along the periphery thereof. Such adjustment provides means for accurately timing the actuation of the valve. The fingers are prevented from anti-clockwise motion by a stop 171 and are permitted to rotate clock-wise by a yielding plunger 172, such clock-wise motion of the fingers being required to permit rotation of the wheel 164 when the valve rotor is actuated by the plunger 160 and the ratchet wheel 168.

The valve 173 is arranged for very close and accurate adjustments vertically and horizontally with respect to its actuating cam upon the carrier 9 and requires some description at this time. This valve 173 is a normally open valve connected in the return line of the hydraulic fluid coming from the motor 138. This valve functions to slow down the motor and consequently the mold carrier, just before the index finger 145 functions to lock the carrier in correct position. The valve 173 is supported upon a bracket 174 which is bolted to the base of the press and is actuated by a roll 175 upon the end of the plunger 176, which moves a pressure balanced flow controlling member within the valve casing. The valve is so positioned that the roll 175 is engaged by a series of four cams 177 upon the face of the mold carrier and near its periphery.

Figure 2:
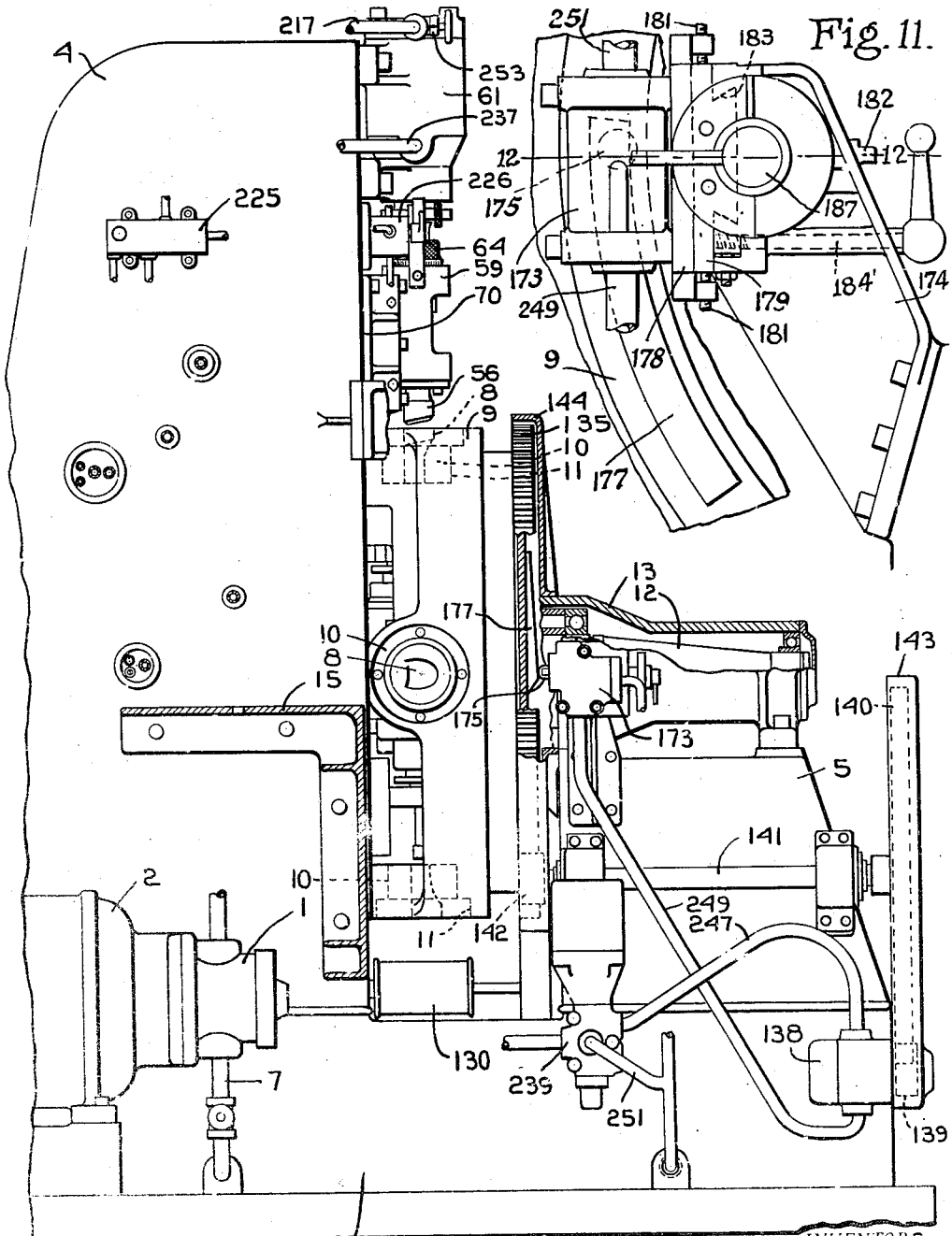
Fig. 2 is a side elevation of the press with parts broken away.

The cams 177 are spaced equi-distant around the periphery of the carrier and are in such spaced relation to the valve plunger that the valve is closed at a predetermined instant just before the carrier is locked in indexed position. The valve is not closed instantly, however, but its closing takes place throughout a period of time determined by the long incline of the cam 177 as shown in Figs. 2 and 11. The valve gradually cuts down the flow of fluid through the motor and thereby decelerates the movement of the carrier. Such gradual deceleration of the rotation of the carrier reduces unnecessary shock and vibration and, furthermore, makes it possible to more readily effect delicate control of the motion of the carrier as it approaches the index position.

Means are provided for facilitating the critical adjustment necessary to stop the carrier at the required instant. A suitable means for accomplishing this result is shown in Figs. 11 and 12, wherein the valve has secured thereto a plate 178, which is vertically movable upon another plate 179. One of the plates is guided upon the other by means of the ways 180. The plate 178 is provided with a pair of bosses at its bottom and top edges, which project laterally outward and are provided with adjusting screws 181, the inner ends of which engage the top and bottom edges of the plate 179. By adjusting the screws 181, a very fine adjustment of the roll 175 along the periphery of the carrier 9 is effected, thus accurately timing the engagement of the cams 177 and the roll 175 of the valve 173. After the proper adjustment has been obtained, the plates 178 and 179 are rigidly locked together by means of the screw 182.

The plate 179 is provided with one member of a dove-tail slide 183, the other member of which is formed upon the bracket 174. The plate 179 is provided with a lateral projection 184, within which is rotatively received the outer end of a threaded adjusting stud 185. The stud is provided with threads upon its inner end and has threaded engagement with a recess 186 in the bracket. The outer end of the stud has secured thereon an adjusting handle 187. The projection 184 is received between the hub of the handle 187 and a flange 188 upon the stud. As the stud is rotated, its bodily movement is transmitted to the plate 179. An "in and out" adjustment of the valve and the roller 175 is thus effected by rotating the stud 185. Such adjustment may be rigidly maintained by a lock screw 184', which acts by reason of screw threaded engagement therewith, to draw the gib of the dove-tail slide 183 into locking engagement with the moveable element of the slide. This adjusting mechanism provides a highly accurate means of determining the exact instant of the closing of the valve. The valve may be adjusted to close at some point along the incline of the cam or to close when the high point of the cam is reached. Such adjustment may be required while the machine is running and can be conveniently effected by manipulating the handle 187. The valve 173 is so constructed that over travel of the stem 176 and the flow controlling element within the valve is permitted beyond the position where the flow of fluid through the valve is entirely cut off.

When the valve 173 is closed, the fluid from the outlet of the motor 138 is forced to pass through a small aperture or needle valve 189 shown in Fig. 19. This valve 189 functions as a bleeder valve and permits a very small flow of fluid to pass through the motor 138, such flow not to be greater than the normal slippage flow of the motor. In this manner, the motor is constantly kept in condition to start instantly when full flow of fluid is applied thereto.

The press is provided with an endless conveyor for feeding a measured quantity of molding material to the hopper 14 prior to each inward strike of the plunger 27. The conveyor is illustrated in Figs. 14 and 15 and is composed of a plurality of buckets 190 secured to a pair of supporting chains 191 at equally spaced intervals. The upper ends of the chains pass over a pair of driving sprockets 192 secured upon a horizontal shaft 193. The shaft 193 is journaled in a bracket or frame 194, which in turn, is supported by a vertically disposed driven shaft 195. The shaft 195 is rotatably received in the upper end of a conveyor supporting bracket 196 securely fastened upon the hopper supporting bracket 15. The bracket 196 corresponds to the bracket 45 illustrated in Fig. 16.

The outer end of the conveyor chains passes over idler sprockets not shown, which are rotatably mounted in a frame not shown, secured upon the outer end of a spreader bar 197, the upper end of which is received in a frame 198, which is provided with a pair of journals within which the shaft 193 rotates. One of the journals projects into the opening 199 in the frame 194, while the other journal receives the outer end of the shaft. The spacer bar 197 maintains the correct tension upon the chains 191. The shaft 193 is rotated by the shaft 195 through a pair of beveled gears 200 and 201. The gear 200 is fixed upon the upper end of the shaft 195 and meshes with the beveled gear 201 keyed upon the shaft 193.

The shaft 195 extends downwardly and is received in the journal 202 in a supporting member 203 securely fastened to the bracket 15, as shown in Fig. 10. The shaft 195 has loosely received thereon a gear 204 upon the hub of which is formed a plurality of ratchet teeth. A tooth ratchet member 205 is splined upon the shaft 195 and pressed into engagement with the ratchet teeth upon the gear 204 by a spring 206 mounted upon the shaft and engaging the ratchet member 205 at one end and a fixed collar 207 at its other end. A rack 208 meshes with the gear 204. The rack is secured to the cross head 122 by means of the connecting bracket 209. The inner edge of the rack slidably engages and is supported against the thrust at the point of engagement of the gear and rack by the ways 124 within which the cross head 122 travels. The rack 208, therefore, is caused to travel with the plunger 27 and in so doing, rotates the gear 204 alternately clock-wise and counterclock-wise with the inward and outward travel of the plunger. Upon the outward stroke of the plunger, the gear 204 rotates counterclock-wise and positively drives the shaft 195 through the ratchet connection beneath the member 205 and the gear 204. The diameter of the gear 204 and the ratio of the gears 200 and 201 is calculated to move the conveyor chains the pitch distance between the buckets 190. The buckets are thereby moved into dumping position above the hopper 14 upon each outward stroke of the plunger, as shown in Fig. 14. Upon the inward stroke of the plunger, the gear 204 rotates idly in a clock-wise direction since the ratchet fails to drive the shaft in this direction.

*Description of the operation of the press*

To more accurately present the complete operating cycle of the press, reference will be had to Fig. 19 in which the mechanical and hydraulic elements of the device are indicated diagrammatically. The main conduit for conducting oil under pressure from the pump to the various elements is shown by double lines indicative of their relatively larger diameter, while the pilot pressure and return lines are indicated by a single line. An electric protective circuit is distinguished from the pilot line by a dot and dash line.

The operator preferably stations himself at the lower end of the conveyor where he measures portions of the molding material containing the required amount for a single heel. This he may do in any suitable manner, as by weighing each portion. The speed of the machine is properly adjusted to permit the operator to weigh portions of the material and place it in successive buckets of the conveyor, as they are presented to him. The conveyor functions to carry the measured quantities of the material and empty it into the hopper 14 at the correct period in the operating cycle of the machine.

As above stated, the motive power for the moving elements is obtained from the pump 1 which is directly connected to an electric motor 2, which draws hydraulic fluid 6 from the reservoir in the base of the press. As is usual in hydraulic systems of this character, a relief valve 210 is placed directly in the main high pressure conduit 211 from the pump 1. This valve automatically maintains a constant required pressure intensity in the power supply conduit. The surplus volume of oil is by-passed from this valve to the return conduit 212, which conducts it back to the reservoir at substantially atmospheric pressure.

The work and return stroke of each of the hydraulic motors or cylinders is controlled by a 4-way valve 213. The control element in the valve 213 has two positions. In one position, oil or other fluid under pressure is admitted to the head end of each of the hydraulic cylinders and in its other position, oil is admitted to the rod end of the cylinders. The actuation of the 4-way valve desirably is accomplished by a system of pilot valve controls.

The valve 213 is remotely controlled by a pair of pilot lines 214 and 215. These two lines are fed with oil under pressure alternately at the proper instant in the cycle of operation by the pilot valve 162. The valve 213 is of a standard type and is provided with an oil inlet and two outlets, into each of which fluid may selectively be fed. When the fluid is fed to one of the outlets, the other outlet acts as a return to conduct oil back to the reservoir at atmospheric pressure.

In describing the operation of the press, it will be assumed that the carrier 9 has made at least one complete revolution and that the various stations have functioned at least once. As illustrated in Fig. 19, all of the plungers have completed their work stroke. To effect this condition, the valve 213 has admitted oil under pressure to a conduit 216. From this conduit the oil flows through the conduit 217 to the head end of the cylinder 61. Conduits 218 and 219 communicate with the conduit 217 and also receive oil under pressure at this time; the conduit 218 feeding oil to the hydraulic motor 67, which actuates the plungers 66 and 68; while the conduit 219 feeds oil to the cylinder 120, which actuates the plunger 27. Obviously, before the plungers start upon their work stroke, it is essential that the molds in the mold carrier be accurately aligned with the respective plungers. A safety device prevents the admission of oil under pressure from the conduit 216 to the conduit 217 until the carrier is exactly indexed.

The cylinders 61, 67 and 120 can receive no fluid pressure until the index finger 145 actuated by the cylinder 149 is firmly seated in the recess 146 in the carrier. Oil under pressure is fed to the cylinder 149 immediately upon the actuation of the 4-way valve 213 because the conduit 220 which feeds oil to the cylinder 149 is connected directly to the conduit 216. When the plunger 145 has acted to accurately index the carrier, the link 159 connected to and moving with the pin 145 actuates the pilot valve 221 through the lever 160 into a position where it admits oil from the pilot pressure supply line 222 to the pilot line 223. The pilot line 223 connects with the normally closed valve 224 in the conduit 217. The pressure thus transmitted through the line 223 when it reaches the valve 224 admits free flow of oil from the conduit 216 to the conduit 217. Thus the various plungers are prevented from moving into the molds until the carrier is accurately and completely indexed, thus protecting the molds from damage.

As shown in the drawings, the plunger 27 has transferred a charge of molding material to the mold at the loading station in the manner heretofore described. The plungers 56 and 66 have pressed a charge, previously loaded into another mold, into its final form at the pressing station and the plunger 68 has ejected a finished heel from a mold at the ejecting station. The next operation in the cycle is the retraction of the plungers and rotation of the mold carrier one-quarter revolution to move each mold to the succeeding station for its next operation. Before the rotation of the carrier takes place, however, an adjustably determined time dwell must elapse. This dwell is effected by a pilot control timing valve 225. This valve is of a standard type and is adjustable within the required time dwell range. When the plungers 56 and 66 reach a point near the end of their work stroke, they actuate respectively a pair of pilot valves 226 and 227, which actuation admits oil from the pilot pressure line 222 respectively into pilot lines 228 and 229. The pilot valves referred to are of suitable and preferably standard types, such as that shown in the drawings, having an open and closed position. Their mechanical operation desirably is effected by fingers adjustably fixed upon and moving with the moving element of the plunger. The valve 226 is actuated by a finger 226', while the valve 227 is actuated by the finger 227'. The pilot line 229 communicates with the port 230 on the valve 225. When oil under pressure is admitted to this line a moving element within the valve 225 is started upon a stroke, the extent of which determines the time element. The pilot line 228 leading from the valve 226 communicates with the port 231 on the valve 225, thus applying pressure at this point. When the moving element within the valve 225 has reached the end of its stroke at the end of the elapsed time, the port 231 becomes connected with an outlet port 232, to which is connected a pilot line 233. The pilot line 233 communicates with a hydraulic cylinder upon the pilot valve 162 and the flow of oil in this pilot line acts to raise the plunger 166, which through the latch 167 and the ratchet wheel 168, rotates the valve element through 45°, which changes the flow of oil in the pilot lines 214 and 215 communicating with the 4-way valve 213, which is caused to shut off the oil flow from the pump 1 to the conduit 216 and causes it to flow in the conduit 235. The 4-way valve at this time also connects the conduit 216 with the main return conduit 236, which empties into the oil reservoir. Thus upon the return stroke of the plungers, the spent oil in the head end of the cylinders is permitted to flow freely back to the reservoir.

It should be pointed out at this time, that upon actuation of the pilot valve 227, not only is the time dwell mechanism set in motion, but another function is performed. The pilot line 229 connects with another line 234 leading to the pilot cylinder on the valve 162. The connection of the line 234 with the pilot cylinder is such that immediately upon application of pressure in the line 229, the plunger 166, which prior to this time is in its upper position, is forced down into position ready to function, as above described, at the end of the time dwell.

All operations have now been followed up to the time when the main supply of oil has been admitted to the conduit 235 by the 4-way valve. The flow of oil from the conduit 235 passes into a plurality of connections leading to the rod end of the hydraulic cylinders. The connecting line 237 conducts oil under pressure to the rod end of the cylinder 61. The connecting line 238 leads to the ports 89 and 90 upon the hydraulic cylinder 67 and also to an electrically operated valve 239, the function of which will be described hereinafter and to the rod end of the cylinder 149. Another line 240 connects the conduit 235 with the rod end of the cylinder 120. All of the plungers except the plunger 56 are immediately retracted. The spent oil in the head end of the cylinders is returned through the conduits connected to their respective head ends by way of the conduit 216, the valve 213 and the conduit 236.

It has been found in molding material of the character herein dealt with, that heels or similar articles will held their shape after ejection from the molds, if the pressure, directly after the molding operation, has been completed, is relieved first at the lower or small end of the mold cavity. The procedure in this respect will vary according to the character of the molded article and the construction of the mold. Accordingly, the bottom plunger 66 is permitted to be immediately retracted. At this instant, the pilot valve 227 is still in its open position conducting oil under pressure to the line 229. The line 229 is connected to a pilot operated check valve 241 inserted in the conduit 217 through a pilot line 242. The check valve 241 permits free flow of oil into the head of the cylinder 61 at all times, but checks the return flow thereto when pilot pressure is applied thereto through the line 242. The immediate retracting movement of the plunger 56 is thereby prevented by check valve 241. The time element which elapses before the plunger 56 starts its retracting movement may be determined in any suitable manner. In the embodiment of the invention shown herein, a short period of time elapses after the plunger 66 starts its retracting movement and before the pin 227' connected to that plunger engages the finger 243 upon the actuating member 244 of the pilot valve 227. This time lag has been found to be satisfactory, but if more or less time is found to be proper, any suitable arrangement may be made to establish such a lag. When the finger 243 is engaged by the stud 227', the pilot valve cuts off the pressure from the lines 229 and 242, thereby relieving the check valve 241 and permitting the return flow of oil through the conduit 217 to take place and permitting the plunger 56 to move into its retracted position.

During the retracting motion of the plungers before they reach the end of their retracting stroke, the valve 239 remains closed. This valve controls the flow of oil to the rotary hydraulic motor 138 through the conduit 247. The valve 239 is automatically opened when the plungers have reached the end of their retracting stroke. The operation of this valve may be accomplished in any suitable manner and it may be of any desired construction. As herein illustrated, the valve 239 is a standard type of electric solenoid valve. The solenoid 245 shown diagrammatically in the drawings is connected in series in an electric circuit 246. The circuit 246 has connected in series therein a plurality of single pole switches 57, 106, 109, 129 and 157, all of which must be closed before current will flow in the circuit. The circuit may be energized in any suitable manner as by connection to a commercial circuit or by means of a battery 248.

All of the switches are placed with relation to their respective actuating cams to close when the plungers have been retracted, at which time the solenoid 245 upon the valve 239 becomes energized, thus opening the valve, thereby permitting the oil under pressure to flow to the motor 138 through the conduit 247. The motor thus is caused to function and continues to rotate the carrier at a speed which is reasonably fast until it has almost completed one-quarter revolution. During this rotation of the carrier, the exhausted oil from the motor 138 flows freely through the conduit 249, through the normally opened valve 173 and returns to the oil reservoir through the conduit 251. As the carrier approaches its next index position, one of the cams 177 on the carrier engages the roll 175 on the plunger 176 of the valve 173, hereinbefore described. As the carrier continues to move, the roll 175 rides up on the inclined face of the cam gradually closing the valve, thus restricting the exhaust flow of oil from the motor and slowing down its speed. The valve is so adjusted that it will entirely close just as the carrier reaches its index position.

A micrometer adjustment of this valve is provided for, by supporting it upon a bracket 174 and providing horizontal and vertical micrometer adjustments therefor in the manner hereinbefore described. Substantially at the same instant the carrier arrives at indexed position, one of the fingers 170 on the carrier strikes the tooth wheel 164, thus actuating the pilot valve 162, which reverses the pilot pressure in the lines 214 and 215, thus reversing the flow in the conduits 216 and 235 leading from the 4-way valve. Oil under pressure is thereby cut off from the conduit 235 and is admitted to the conduit 216. This pressure is immediately applied to the head end of the cylinder 149, which forces the finger 145 into its carrier locking position and when the finger has reached this position, the pilot valve 221 is again actuated to admit pressure to the pilot line 223, which releases the check valve 224, thus admitting pressure to the head end of the cylinders, thus starting the plungers on their work stroke again. The cycle of operation above described is again repeated automatically, so long as the press is maintained in operation.

After each of the pilot valves 226, 227 and 221 have been actuated to apply pressure to their respective pilot control lines, they are closed upon the return stroke of the plunger. Each of these pilot valves, including the valve 162 and also all the remotely actuated check valves and the 4-way valve 224 are connected to a pilot drain 252. All surplus oil accumulated in the valves during their operation is allowed to drain off at atmospheric pressure through the drain system 252, while the valves are in their closed or off position. The moving element in the timing valve 225 is restored to its initial position by a spring not shown, after pressure is cut off in the pilot line 229 and the accumulated oil therein is allowed to drain through the line 252.

It is desirable in molding certain types of material to accurately control the timing of one or both of the plungers during their work stroke, independently of the resistance offered by the molding material as it is compressed in the mold. Such control of the plungers is desirable when molding material of the character herein suggested. The speed of the plunger 56 may be controlled by a manually adjustable flow control valve 253 in the conduit 217. Desirably, means are also provided to accurately control the speed of travel of the bottom plunger 66 and by this means, the time at which the two plungers reach the end of their working stroke, may be varied at will, since the initiation of their stroke is simultaneous. Such timing control of the plungers provides a means for varying certain characteristics of the molded article to fulfill a desired result.

To illustrate the principle involved, the following example of its application is given. While the general principle is applicable to the molding of various articles, the particular example given herein, relates to the molding of heels for shoes. It is important in producing a heel, that the seat and particularly the outer edges thereof be uniformly dense and hard. While it is possible to mold satisfactory heels without the control herein specified, it is possible, by the use of such control, to manufacture heels of a much higher quality, which render a great deal longer service.

After extensive experimentation, in which the shape of the mold, the character of the material and its behavior under pressure was carefully studied, certain adjustments of the plungers were found to produce certain desired characteristics in the product. To produce a durable heel having a hard seat and a uniformly dense and tough peripherial edge, the plunger strokes are so adjusted that the lower plunger 66 reaches the end of its work stroke before the top plunger 56 completes its stroke. Due to the relatively non-fluent character of the material and the friction between the molding material and the walls of the mold, it is possible to control the physical characteristics of the heel or other molded article by controlling the timing of the stroke of the molding plungers.

To insure complete flexibility and accuracy in the control of the plungers, a special valve 254 is inserted in the conduit 218 leading to the hydraulic motor 67, which actuates the plunger 66. The valve 254 is of a commercial type of flow control valve having suitable indications, by means of which a desired flow of liquid to the cylinder may automatically be maintained and the same condition again established after a re-adjustment of the valve has taken place, by setting the adjusting member to the required indication mark.

A check valve 255 desirably is inserted in a by-pass line around the valve 254. This check valve cuts off the flow of oil through the by-pass line to the motor 67, thereby insuring that the flow of oil in this direction must be through the control valve and permits free return flow of oil through the by-pass from the motor, thereby permitting the plungers to return quickly.

To facilitate the operation of the press, a special control is provided, by means of which press may be started and stopped while the pump 1 and the motor 2 are running. The relief valve 210 is provided with a pilot control, by means of which the flow control of oil through the various elements of the press may be cut off and this pilot control is utilized to provide a simple means of controlling the operation of the press. A manually operable pilot valve 256 is placed at a convenient location and its inlet port is connected to the pilot pressure supply line 222. The pilot valve outlet port is connected to the pilot control port 257 on the valve 210 through the pilot line 258. When pilot pressure is applied to the valve 210, no flow takes place in the main conduit leading to the 4-way valve. When, however, pilot pressure is released by the manually operated valve, normal flow takes place. In this way, a simple and easily manipulated control is provided for stopping and starting the press.

Independent control of the rotation of the carrier wheel may be provided by placing a manually operable switch 260 in the electric circuit 246. By operating the switch 260 the electric circuit is opened and closed, thereby controlling the motor 138 through the solenoid valve 239.

It is desirable that means be provided for adjustably predetermining the pressure intensities of the oil applied to the cylinders which function to move the plungers 56 and 66. This may be done in any suitable manner and is accomplished in the illustrated embodiment of the invention by inserting an adjustable pressure regulating valve 261 in the conduit 218. The valve 261 is adjustable to obtain a constant predetermined pressure intensity in the oil supply reaching the motor 67. Surplus oil is permitted to escape from this valve and is led to the oil reservoir in the base of the press through the conduit 262. The pressure intensity of the oil fed to the cylinder 61 is regulated, as above stated, by the valve 210. The pressure intensity acting to move the plunger 66 may be regulated by properly adjusting the valve 261 and may be set at any intensity below that of the pressure intensity in the other parts of the system.

During the operation of the machine, the plunger 20 of the hopper mechanism is mechanically operated by the cam 36 upon the rotating carrier and the lever 37 in properly timed relation to the plunger 27, as hereinbefore set forth. The hydraulic operation of the hopper, however, is accomplished by a specially devised pilot control system illustrated diagrammatically in Fig. 18. The hydraulic operation of the plunger 20 is accurately timed with respect to the plunger 27 and the operation of both plungers is accurately timed with respect to the general operating cycle of the press.

When the 4-way valve 213 is actuated to apply pressure to the conduit 216, pressure is instantly transmitted to the cylinder 149, which locks the carrier in index position, as hereinbefore described. This same flow of oil also flows through the conduit 263 into the head end of the cylinder 52, which causes the plunger 20 to execute its work stroke, forcing a measured quantity of molded material into the chamber 25. During these operations, the pressure in the conduit 216 is prevented from reaching the cylinder 120 through the conduit 219 by the pilot control check valve 264. When, however, the rack 49 has moved the plunger 20 to the end of its work stroke, a finger 265 upon the rack bar, engages the actuating arm 266 of the pilot valve 267. Such actuation of the valve instantly conducts pilot pressure from the pilot supply line 222 to the pilot line 268, which opens the valve 264, admitting oil under pressure to the head end of the cylinder 120, thus forcing the plunger 27 inwardly, transferring the material in the chamber 25 to the mold cavity 8. Just before the plunger 27 reaches the end of its inward stroke, a finger 269 secured upon the end of a supporting rod 270 rigidly connected to the cross head 122, engages the actuating arm 271 upon a pilot valve 272 acting to close the valve. The 4-way valve 213 is now actuated to cut off the flow of oil to the conduit 216 and cause the oil to flow through conduit 240, which is connected to the rod end of the cylinder 120. Up to this instant, the pilot control valve 273 prevents flow of oil to the rod end of the cylinder 52. When, however, the plunger 27 starts its retracting movement, the finger 269 engages the actuating arm 271 again moving it, but in the opposite direction, thus opening the valve 272. Whereupon pilot pressure is applied to the valve 273 through the pilot line 274, which acts to open the check valve 273 admitting oil to the rod end of the cylinder 52 through the conduit 275, which results in retracting the hopper plunger 20.

It will be observed that the above described pilot controlled hydraulic operation of the hopper insures accurate timing of each of the elements thereof. The pilot valve 267 acts with the check valve 264 to prevent inward movement of the plunger 27 until the hopper plunger 20 has reached the end of its work stroke, thereby insuring that the plunger will transfer every particle of the material, deposited into the hopper by the conveyor bucket, to the mold cavity. Furthermore, it will be noted that upon initiation of the retracting stroke of plunger 27, the hopper plunger 20 is caused to be retracted. As hereinbefore pointed out, the return stroke of the plunger 27 effects the operation of the conveyor. Therefore, as a result of the pilot controlled operation, the hopper plunger is automatically retracted just before the conveyor empties the contents of a bucket into the hopper. Thus, the material is permitted to freely flow by gravity to the lower-most portion of the hopper chamber 18, as shown in Fig. 6.

We claim:

1. In a heel molding press, a fluid power-actuated pressing unit comprising, an outer cylinder, an inner cylinder telescoping within said outer cylinder, a piston in each cylinder, a chamber common to both pistons, into which fluid under pressure is fed and plungers attached to the pistons, one of which acts to compress the material in the mold and the other to eject the molded article, a plurality of molds, means for charging the molds with molding material, and means for positioning the molds with respect to the plungers to permit the plungers to execute their respective functions in sequence.

2. In a press for molding plastic material having a rotating mold carrier containing a plurality of molds, automatic means for indexing said carrier in accurately predetermined position, comprising a hydraulic motor for rotating said carrier successively to present the molds to a plurality of operating stations, a source of hydraulic power for actuating said motor, a main motor controlling valve, an auxiliary motor controlling valve for decelerating the motor, a cam on said carrier for each mold, said cam co-acting with said auxiliary valve to gradually cut off power to said motor, thereby to decelerate said carrier upon its approach to indexing position, means for adjusting the decelerating action of said cam and auxiliary valve, and means to lock said carrier in accurately indexed position.

3. In a press for molding plastic material, a rotatable ring-shaped mold carrier, a plurality of molds therein, a plunger cylinder located within the periphery of said carrier and rigidly secured to the frame of the press, two pistons acting within the cylinder and telescoping one within the other, a plunger connected to each piston, one of said plungers acting to press the material in the mold and the other plunger acting simultaneously to eject an article previously compressed in another mold and stop means situated externally upon said cylinder for limiting the extent of the work stroke of said pressing cylinder.

4. In a press for molding plastic material, a rotatable carrier, a plurality of molds disposed along the periphery of the carrier and movable therewith, a plunger around which the carrier extends, the plunger being movable outwardly from within the carrier to compress material in the molds, means within the carrier for limiting outward movement of the plunger to predetermine the amount of compression in the molds, and means within the carrier rotatable about the plunger as an axis for adjusting said limiting means.

5. In a press for molding plastic material, a rotatable carrier, a plurality of molds disposed along the periphery of the carrier and movable therewith, a plunger around which the carrier extends, the plunger being movable outwardly from within the carrier to compress material in the molds, means within the carrier for limiting outward movement of the plunger to predetermine the amount of compression in the molds, and gearing within the carrier for adjusting said limiting means and including a ring gear extending around the plunger and rotatable about the plunger as an axis.

6. In a press for molding plastic material, a rotatable carrier, a plurality of molds disposed along the periphery of the carrier and movable therewith, a cylinder within the carrier, a plunger in the cylinder movable outwardly from within the carrier to compress material in the molds, means within the carrier for limiting the outward movement of the plunger to predetermine the amount of compression in the molds, a member mounted on the cylinder and rotatable on the cylinder as an axis, and means responsive to rotation of said member for adjusting said limiting means.

7. In a press for molding plastic material, a rotatable carrier, a plurality of molds disposed along the periphery of the carrier and movable therewith, a cylinder within the carrier, a plunger in the cylinder movable outwardly from within the carrier to compress material in the molds, a threaded stop, an element connected to the plunger and engageable with the stop for limiting outward movement of the plunger to predetermine the amount of compression in the molds, a pinion on the stop, and a ring gear extending around the cylinder and meshing with the pinion, said gear being rotatable about the cylinder as an axis to rotate the pinion and adjust the stop.

8. In a molding press, a rotatable carrier, a plurality of molds disposed along the periphery of the carrier and movable therewith, means for supplying molding material to the molds, a cylinder around which the carrier extends, a pair of pistons in the cylinder, the cylinder containing a chamber common to both pistons, plungers connected to the pistons and disposed adjacent remote portions of the carrier, means for indexing the carrier to move the molds successively adjacent the plungers, and means for supplying fluid under pressure to said chamber to move one of the plungers into the adjacent mold and compress the material therein and simultaneously move the other plunger into another mold to eject the molded article.

9. In a molding press, a rotatable carrier, a plurality of molds disposed along the periphery of the carrier and movable therewith, means for supplying molding material to the mold, a cylinder around which the carrier extends, a pair of pistons in the cylinder, the cylinder containing a chamber common to both pistons, plungers connected to the pistons and disposed adjacent remote portions of the carrier, means for indexing the carrier to move the molds successively adjacent the plungers, means for supplying fluid under pressure to said chamber to move one of the plungers into the adjacent mold and simultaneously move the other plunger into another mold, and means operable by one of said plungers for controlling the supply of fluid by said fluid supply means.

10. In a molding press, a rotatable carrier, a plurality of molds disposed along the periphery of the carrier and movable therewith, means for supplying molding material to the mold, a cylinder around which the carrier extends, a piston in the cylinder, a plunger at one end of the cylinder connected to the piston, the piston having a recess at its inner end, a cylinder within the first cylinder having a part fitted closely in said recess and communicating with the recess, a piston in the second cylinder, a plunger at the opposite end of the first cylinder connected to said last piston, said plungers being disposed adjacent remote portions of the carrier, means for indexing the carrier to move the molds successively adjacent the plungers, and means for supplying fluid under pressure to said recess to move one of the plungers into the adjacent mold and simultaneously move the other plunger into another mold.

11. In a molding press, a rotatable carrier, a plurality of molds disposed along the periphery of the carrier and movable therewith, means for supplying molding material to the mold, a pair of concentric, fixed, intercommunicating cylinders around which the carrier extends, one of said cylinders being positioned within the other, pistons in said cylinders movable outwardly away from each other, plungers on the pistons disposed adjacent remote portions of the carrier, means for indexing the carrier to move the molds successively adjacent the plungers, and means for supplying fluid under pressure to the cylinders between the pistons to move one of the plungers into the adjacent mold and simultaneously move the other plunger into another mold.

12. In a press for molding heels, a base, a pair of columns projecting upwardly from the base, a shaft journaled in one of the columns, a mold carrier mounted for rotation on the shaft and having a rim, a plurality of molds disposed around the rim, a cylinder secured to the other column and around which said rim extends, a pair of pistons in the cylinder, the cylinder having a chamber common to both pistons, plungers on the pistons disposed adjacent remote portions of the rim, means for indexing the carrier to move the molds successively adjacent the plungers, and means for supplying fluid under pressure to said chamber to move one of the plungers into the adjacent mold and simultaneously move another plunger into another mold.

CHARLES FAIR.
CHARLES B. GARY.

CERTIFICATE OF CORRECTION.

Patent No. 2,287,675. June 25, 1942.

CHARLES FAIR, ET AL.

It is hereby certified that error appears in the printed specification of the above numbered patent requiring correction as follows: Page 6, first column, line 50, for the words "pair or" read --pair of--; page 9, first column, line 28, for "beneath" read --between--; page 10, second column, line 10, for "held" read --hold--; page 11, first column, line 48, after the word "drain" and before "252" insert --system--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.